United States Patent [19]

Ahmad

[11] Patent Number: 5,565,908
[45] Date of Patent: Oct. 15, 1996

[54] BI-DIRECTIONAL SYSTEM FOR PROVIDING INFORMATION, MANAGEMENT, AND ENTERTAINMENT SERVICES

[75] Inventor: Khurshid Ahmad, Palo Alto, Calif.

[73] Assignee: Kayon Systems, Inc., Mountain View, Calif.

[21] Appl. No.: 58,734

[22] Filed: May 7, 1993

[51] Int. Cl.⁶ ................................................ H04N 7/173
[52] U.S. Cl. ................................................... 348/7; 348/8
[58] Field of Search ............................... 348/6, 7, 8, 10, 348/12; 455/3.1, 4.1, 4.2, 5.1, 6.1, 6.2; 358/86; H04N 7/10, 7/14, 7/16, 7/173

[56] References Cited

U.S. PATENT DOCUMENTS

| | | |
|---|---|---|
| 4,381,522 | 4/1983 | Lambert . |
| 4,422,093 | 12/1983 | Porgee, Jr. . |
| 4,700,386 | 10/1987 | Kohn . |
| 4,852,154 | 7/1989 | Lewis et al. . |
| 4,890,319 | 12/1989 | Seth-Smith et al. . |
| 4,890,320 | 12/1989 | Monslow et al. . |
| 4,947,244 | 8/1990 | Fenwick et al. . |
| 4,991,011 | 2/1991 | Johnson et al. . |
| 4,994,908 | 2/1991 | Kuban et al. . |
| 4,995,078 | 2/1991 | Monslow et al. . |
| 5,001,554 | 3/1991 | Johnson et al. . |
| 5,065,235 | 11/1991 | Iijima ........................................... 455/6.1 |
| 5,077,607 | 12/1991 | Johnson et al. . |
| 5,089,885 | 2/1992 | Clark . |
| 5,132,789 | 7/1992 | Ammon et al. . |
| 5,172,413 | 12/1992 | Bradley et al. . |
| 5,181,106 | 1/1993 | Sutherland . |
| 5,247,364 | 9/1993 | Banker et al. ............................ 348/10 |
| 5,351,075 | 9/1994 | Herz et al. . |
| 5,421,031 | 5/1995 | DeBey . |
| 5,442,389 | 8/1995 | Blahut et al. . |

*Primary Examiner*—David E. Harvey
*Attorney, Agent, or Firm*—Townsend and Townsend and Crew LLP

[57] ABSTRACT

A system for providing information, management, and entertainment services is described. The system enables the user to select a service via a remote control. Once the system receives a request from the user, it processes the request to determine which service is requested and provides the service to the user.

22 Claims, 18 Drawing Sheets

| CHANNELS → | | | | | | | | | | | | | | | |
|---|---|---|---|---|---|---|---|---|---|---|---|---|---|---|---|
| MODULATOR GROUP 1 | 24 | 25 | 26 | 27 | 28 | 29 | 30 | 31 | 32 | 33 | 34 | 35 | 36 | 37 | 38 |
| MODULATOR GROUP 2 | 24 | 25 | 26 | 27 | 28 | 29 | 30 | 31 | 32 | 33 | 34 | 35 | 36 | 37 | 38 |
| COMMON MODULATOR GROUP 1 | 14 | 15 | 16 | 17 | 18 | 19 | 20 | 21 | 22 | 23 | | | | | |
| MODULATOR GROUP 3 | 24 | 25 | 26 | 27 | 28 | 29 | 30 | 31 | 32 | 33 | 34 | 35 | 36 | 37 | 38 |
| MODULATOR GROUP 4 | 24 | 25 | 26 | 27 | 28 | 29 | 30 | 31 | 32 | 33 | 34 | 35 | 36 | 37 | 38 |
| COMMON MODULATOR GROUP 2 | 14 | 15 | 16 | 17 | 18 | 19 | 20 | 21 | 22 | 23 | | | | | |
| BROADCAST CHANNELS | 39 | 40 | 41 | 42 | 43 | | | | | | | | | | |

FIG. 7d

```
CHANNEL-(14)  (A)   120-126 MHZ
CHANNEL-(15)  (B)   126-132 MHZ
CHANNEL-(16)  (C)   132-138 MHZ
CHANNEL-(17)  (D)   138-144 MHZ
CHANNEL-(18)  (E)   144-150 MHZ
CHANNEL-(19)  (F)   150-156 MHZ
CHANNEL-(20)  (G)   156-162 MHZ
CHANNEL-(21)  (H)   162-168 MHZ
CHANNEL-(22)  (I)   168-174 MHZ
CHANNEL-(23)  (J)   216-222 MHZ
CHANNEL-(24)  (K)   222-228 MHZ
CHANNEL-(25)  (L)   228-234 MHZ
CHANNEL-(26)  (M)   234-240 MHZ
CHANNEL-(27)  (N)   240-246 MHZ
CHANNEL-(28)  (O)   246-252 MHZ
CHANNEL-(29)  (P)   252-258 MHZ
CHANNEL-(30)  (Q)   258-264 MHZ
CHANNEL-(31)  (R)   264-270 MHZ
CHANNEL-(32)  (S)   270-276 MHZ
CHANNEL-(33)  (T)   276-282 MHZ
CHANNEL-(34)  (U)   282-288 MHZ
CHANNEL-(35)  (V)   288-294 MHZ
CHANNEL-(36)  (W)   294-300 MHZ
CHANNEL-(37)  (AA)  300-306 MHZ
CHANNEL-(38)  (BB)  306-312 MHZ
CHANNEL-(39)  (CC)  312-318 MHZ
CHANNEL-(40)  (DD)  318-324 MHZ
CHANNEL-(41)  (EE)  324-330 MHZ
CHANNEL-(42)  (FF)  330-336 MHZ
CHANNEL-(43)  (GG)  336-342 MHZ
```

FIG. 8

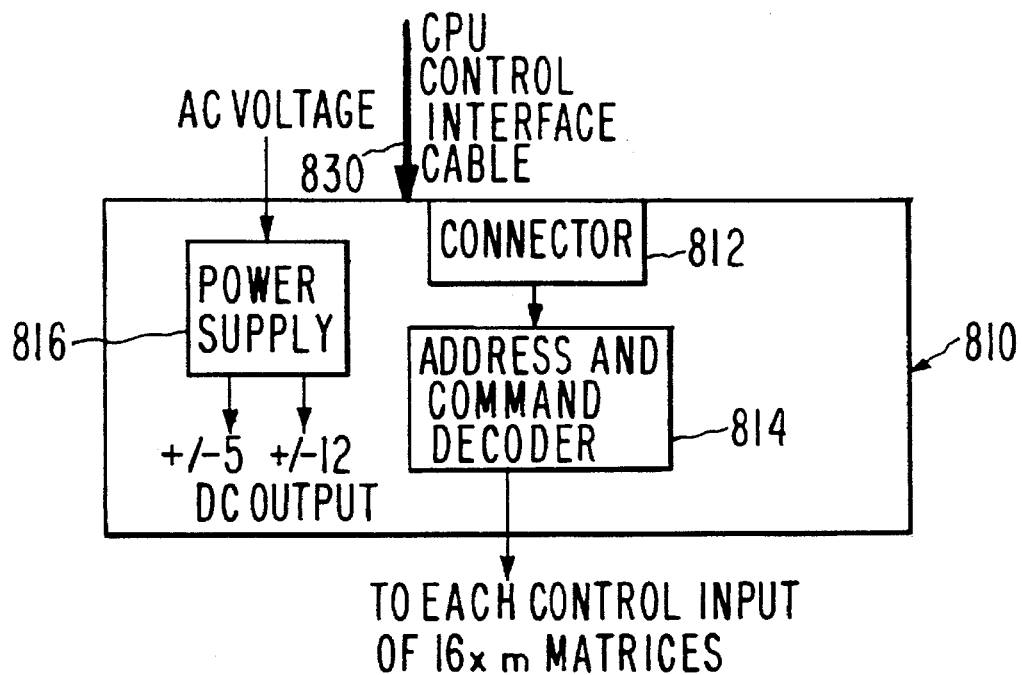
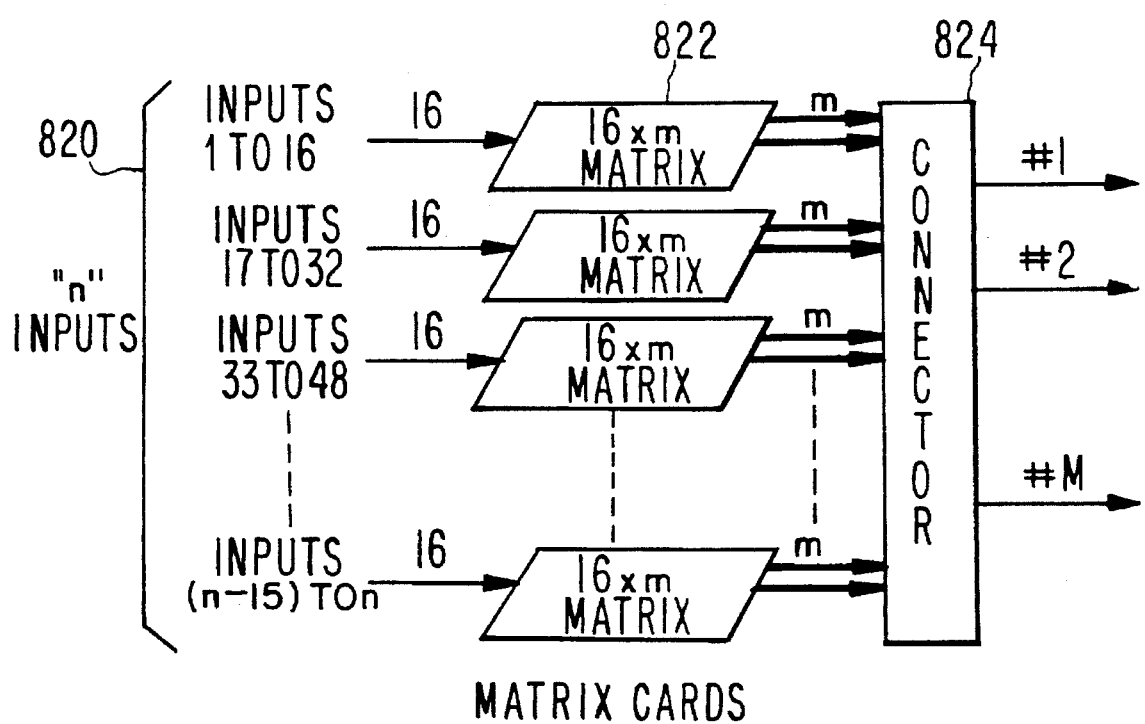
FIG. 9a 5,565,908

BI-DIRECTIONAL SYSTEM FOR PROVIDING INFORMATION, MANAGEMENT, AND ENTERTAINMENT SERVICES

BACKGROUND OF THE INVENTION

This invention primarily relates to the field of two-way interactive entertainment systems typically provided over cable facilities to a user.

Two-way interactive cable television systems are known for transmitting entertainment, information and data signals over a cable facility toward a plurality of users. Home shopping, pay-per-view, and other services are provided via such systems where goods or services are ordered by a subscriber or user and a payment is accepted by the service provider. Typically, payment is arranged over a separate link such as a telephone line to the service provider.

Data may be transmitted and addressed to a particular subscriber of a cable television system over a separate data channel or a so-called "in-band" data channel. In this downstream direction, addressed control data may represent services authorized to a particular terminal or control commands to that terminal. In an upstream direction from a terminal to the service provider or system manager location, control data may represent selections made by a user in response to a polling request or at the time of user selection.

In some known cable television systems, the capability exists to provide a so-called teletext service in which screens of textual information may be provided to a user sequentially at a user's request. Also, a cable television terminal is known which comprises a graphics/text generator for composing text screens from data transmitted on a special channel or inserted in vertical blanking intervals of a video signal and transmitted over a television channel.

Outside of a cable television environment, stand-alone systems are known for hotels and restaurants in which transactions may be entered via remote terminals to be transferred to a central location where they are recorded. At time of check-out or bill payment, a bill may be tabulated at the central location and payment by credit card made without intervention of management personnel.

In a cable television system designed for installation in a hotel, a terminal is known which may report to the system manager short bursts of information such as room number when specifically requested. U.S. Pat. Nos. 3,944,742 and 4,360,828 describe such a system in which, for example, a hotel room air conditioner may be controlled from the front desk; a maid may report on the room number of the hotel room currently being cleaned; or the television channel number currently being viewed by a hotel guests may be reported. The data is transmitted upstream over a 12 megahertz data carrier in short bursts and within a predetermined period of time after a polling request.

The above mentioned systems are configured to provide a limited number of services to the user; in most cases one or two service. Furthermore, some systems incorporate blocking networks, wherein sometimes an available input may not be connected to an available output. For example, if the system is being used to provide movie 1 to a user, a second user cannot request movie 2 because of the blocking architecture. It is apparent that a system with a blocking network cannot function as efficiently as a system with a non-blocking network.

In view of the above, a requirement exists in the art for an interactive system that provides a series of services to the user. Furthermore, a requirement exists for a system that implements a non-blocking network architecture which is able to provide a service on any available channel if the service is available. Finally, a requirement exists for a system with modular architecture for flexibility and economics.

SUMMARY OF THE INVENTION

The present invention is directed to a system and method for providing information, management, and entertainment services to a user. The system includes a master processor, a controller module, a first In-Room Control Module ("ICM"), a first TV monitor coupled to the ICM, and an audio/video module. The user selects a service from a menu of services presented to him/her. The ICM receives a request from the user via a remote control service and transmits the request to the controller. The controller continuously polls the ICM for any new requests from the user. Upon receiving the request, the controller sends the request to the master processor. The master processor determines the service corresponding to the request and asks the audio/video module to provide the service to the user. Meanwhile, the master processor asks the controller to command the ICM to tune a specific channel where the service will be presented to the user. The audio/video module sends the requested service, e.g. a movie or a message, to the ICM via a communication means.

In one embodiment of the present invention, the present invention is configured for establishments serving less than eighty users. This embodiment does not require the addition of a complex switching matrix to control the allocation of the signals generated by the audio/video module.

In a second embodiment, the present invention is configured for establishments serving more than eighty users. This embodiment utilizes a switching mechanism that reduces the cost and enhances the operation of the system.

In a third embodiment, the present invention is configured such that each specific service is processed by a processor connected to the system through a Local Area Network ("LAN"). This increases the speed and reliability of the system.

As a result, the present invention enables the user to select any number of services provided by the system via a remote control device. Furthermore, the invention greatly increases the possibility of providing the requested service by implementing a "share architecture" in the system. Finally, the invention increases the speed and reliability of the system by providing for the addition of slave processors that handle the processing of individual services.

BRIEF DESCRIPTION OF THE DRAWINGS

FIG. 7(d) illustrates a typical allocation of the individual modulators among different modulator groups in a system that incorporates the "share architecture";

FIG. 8 lists the respective frequency ranges of channels 14 through 43;

FIG. 9(a) illustrates the elements of a typical non-blocking switch matrix;

DESCRIPTION OF THE PREFERRED EMBODIMENTS

Figure 1:
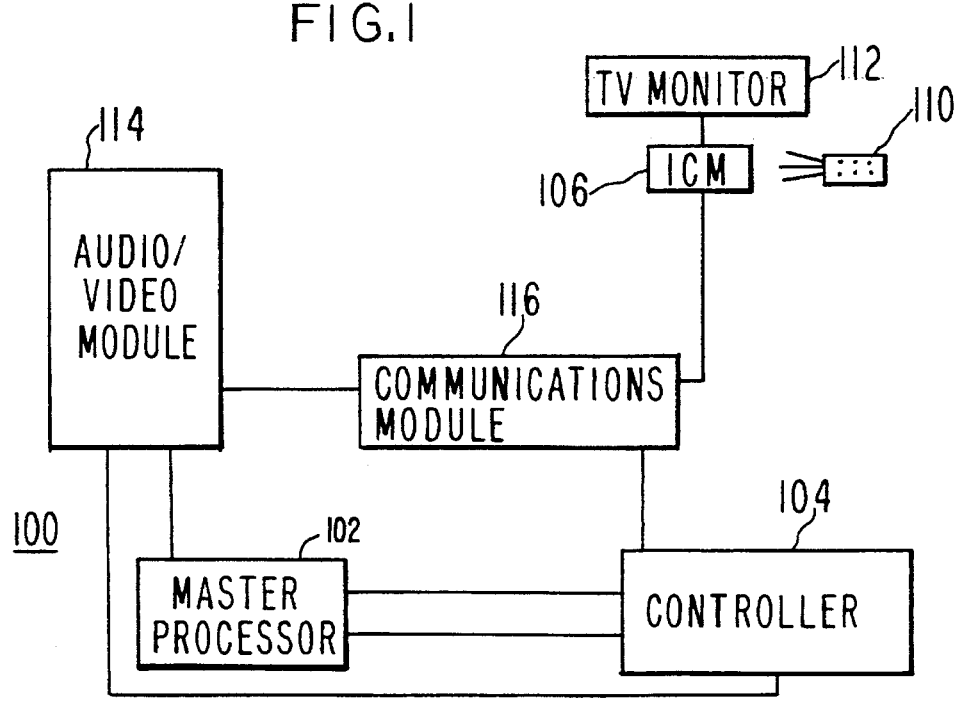
FIG. 1 illustrates the block diagram of the system of the present invention servicing one user.

FIG. 1 illustrates an integrated system 100 for providing information, management services, and on-demand pay-per-view entertainment to a user. For each user, the system contains a unique In-room Control Module ("ICM") 106 associated with a standard TV monitor 112. There is no need for any physical modification of the TV monitors to interface with the system of the present invention. Furthermore, the system can interface with any TV monitor. Where the TV monitor must be mechanically tuned, those functions which are mechanically controlled require user intervention. To operate, if the TV monitor is mechanically controlled, it must be tuned to a specific free channel, typically channel 3 or 4. However, if the TV monitor is controlled by infrared signals, the ICM will tune the TV monitor to a free channel. The TV monitor must always be tuned to one preset channel. This is usually done where a controller takes charge of tuning the TV monitor, for example, a VCR controlling a TV monitor. In the present invention, the control of TV monitor 112 is accomplished through hardware and firmware within ICM 106. ICM 106 has a unique address which enables Central Control Complex ("CCC") 108, located at a central location, to poll it every 200 milliseconds. CCC 108 continuously communicates with each ICM for new requests from the users of the system and to transmit the requested information.

A request for service is transmitted to ICM 106 by the user through Remote Handheld Unit ("RHU") 110. RHU 110 generates an infrared signal corresponding to the user's request. CCC 108 includes master processor 102, control module 104, and Audio/Video module 114. Control module 104 receives the request from ICM 106 and relays it to master processor 102. Once master processor 102 determines what service is requested, it asks control module 104 and audio/video module 114 to provide the requested service to the user. The requested service is provided to the user via ICM 106 by audio/video module 114. The requested service may be a request to see a movie on a pay-per-view basis, request for wake-up calls, a request to see the bill, or any other service selected from a host of services offered by the system. CCC 108 communicates with ICM 106 through communications module 116. Communications module 116 provides the capability of two-way communication between ICM 106 and control module 104. It further relays the signals generated by audio/video module 114 to ICM 106. Although FIG. 1 shows one ICM 106 connected to the system of the present invention, the system is capable of servicing more than one ICM. Since every ICM has its own unique address, system 100 can communicate with any ICM by using their unique address to access them. This approach prevents any possibility of message collision when providing service to more than one user.

Figure 2:
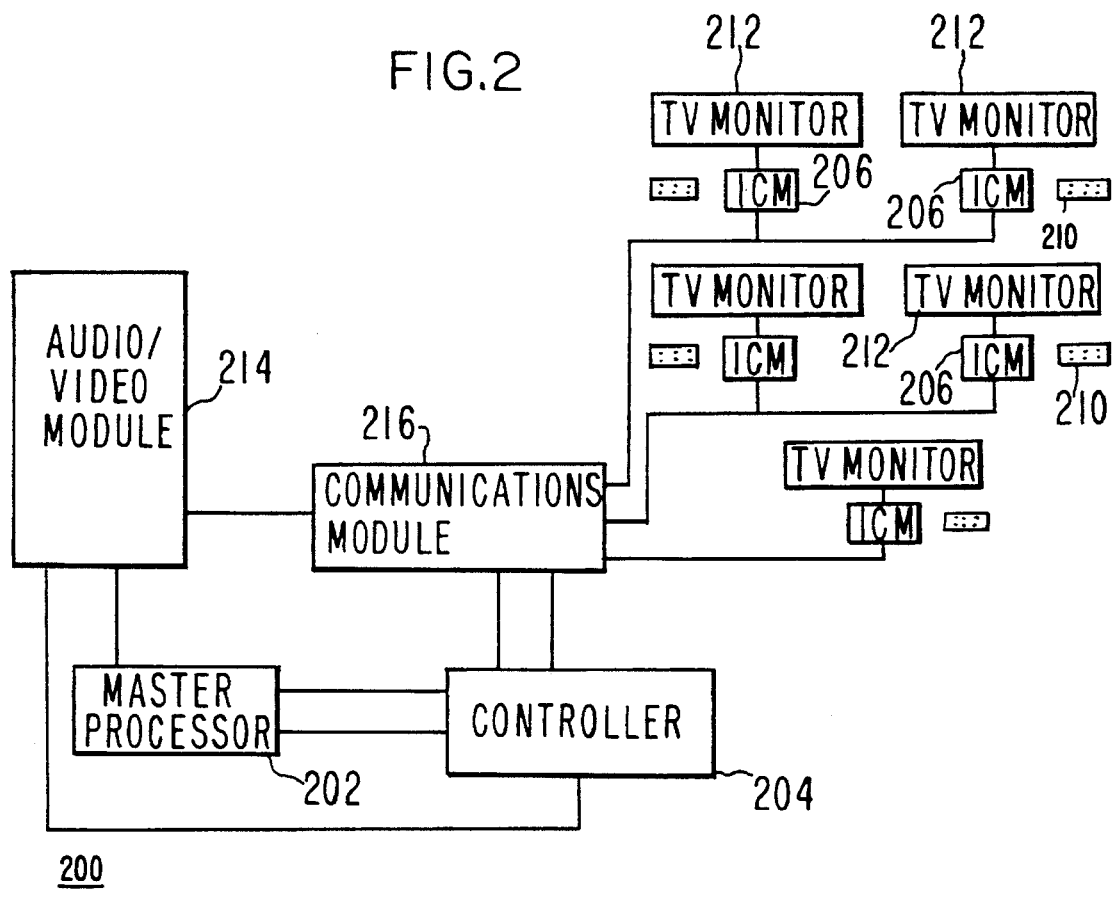
FIG. 2 illustrates the block diagram of the system of the present invention servicing multiple users.

FIG. 2 illustrates the system of FIG. 1 connected to more than one ICM 106, otherwise it is identical to system 100 of FIG. 1. System 200 of FIG. 2 includes a master processor 202, controller 204, ICMs 206, TV monitors 208, RHUs 210, audio/video module 214, and communications module 216. This system is capable of servicing more than one user at a time. Hereinafter, all the references are made to a system that services a multiple number of users (i.e. a system with multiple ICMs).

Figure 3:
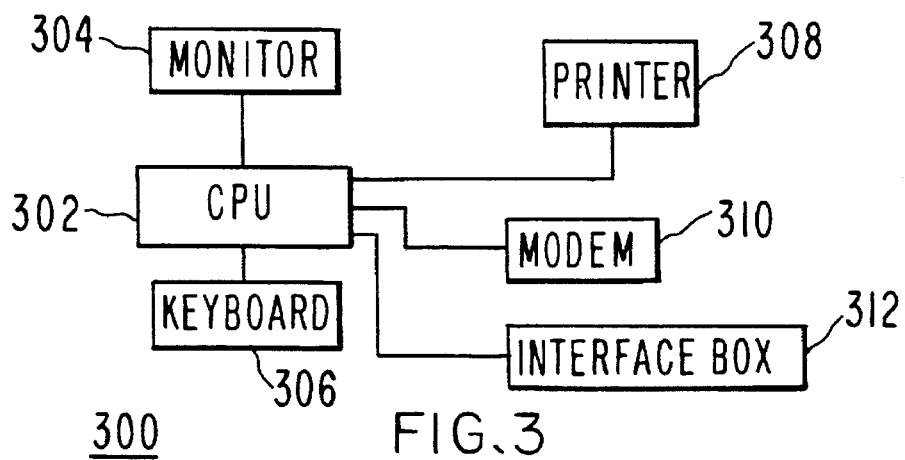
FIG. 3 illustrates the elements of the master processor as shown in FIGS. 1 and 2.

FIGS. 3–9 illustrate the contents of the individual modules in FIG. 2. FIG. 3 shows a block 10 diagram of master processor 202 of FIG. 2. Master processor 300 includes CPU 302, monitor 304, keyboard 306. Printer 308, modem 310, and interface module 312 are shown to illustrate that the system can utilize their services through master processor 300. Master processor 300, through its software, is the source of all decision making processes in the system of the present invention. It determines what services are being requested and directs controller 208 and/or audio/video module 214 to provide the particular service to the user. To determine the specific service, master processor 300 receives a code representing a request from the controller and searches the resident data base for a match to the code. Once a match has been located, the type of the requested service can be determined by master processor 300.

Figure 4:
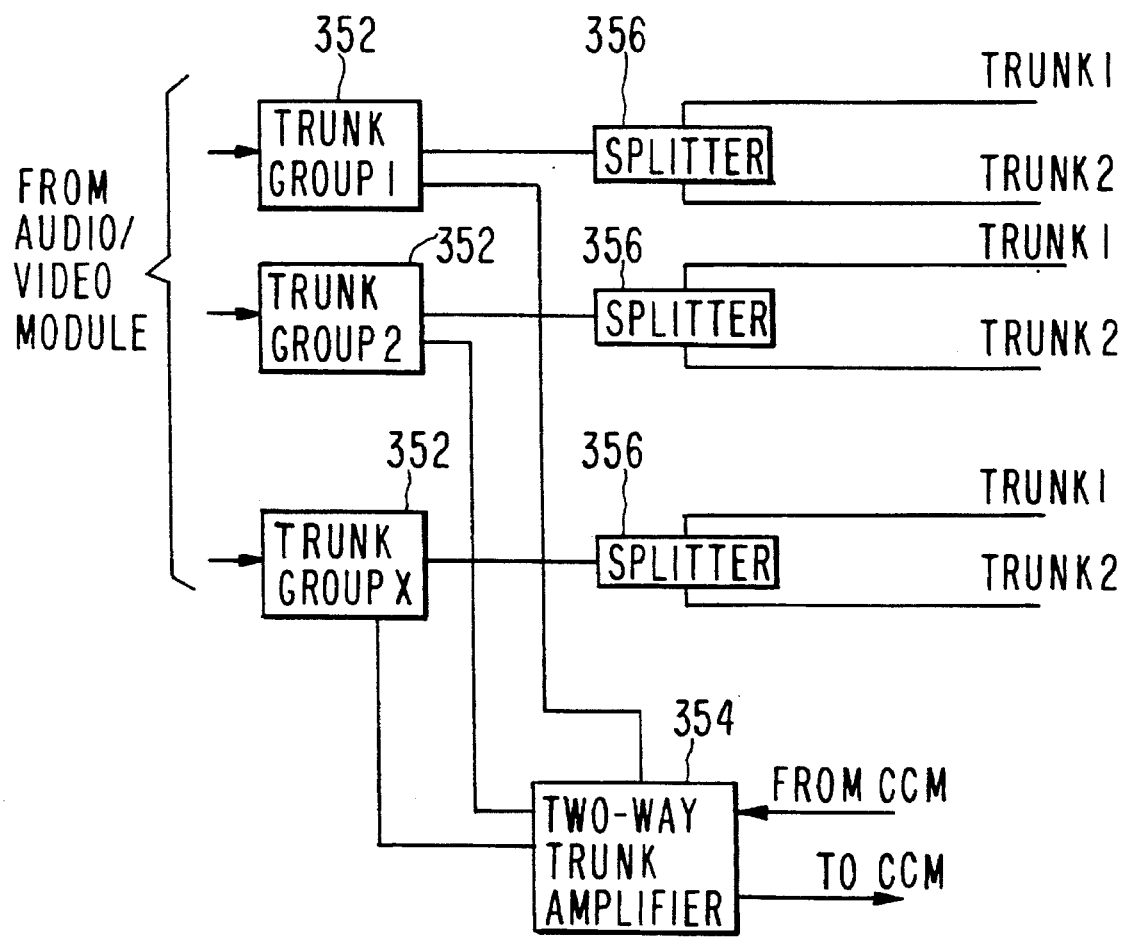
FIG. 4 illustrates the elements of the communications module of FIGS. 1 and 2.

FIG. 4 is a typical communications module 216 of FIG. 2. Communications module 350 includes trunk groups 352, two-way amplifiers 354, and splitters 356. Each trunk group functions as the relay center of the system. The incoming signals from the controller and the audio/video module are relayed to the ICMs connected to the trunk lines shown in FIG. 2. In the other direction, the signals from the ICMs are relayed to the controller through trunk groups 352. Splitters 356 are used to split the power of each signal between trunk lines 1 and 2 as shown in FIG. 4. This enables the system to service more users with one trunk group with a better response time. The two-way amplifier 354 is used to amplify the signals in and out of the controller.

Figure 5A:
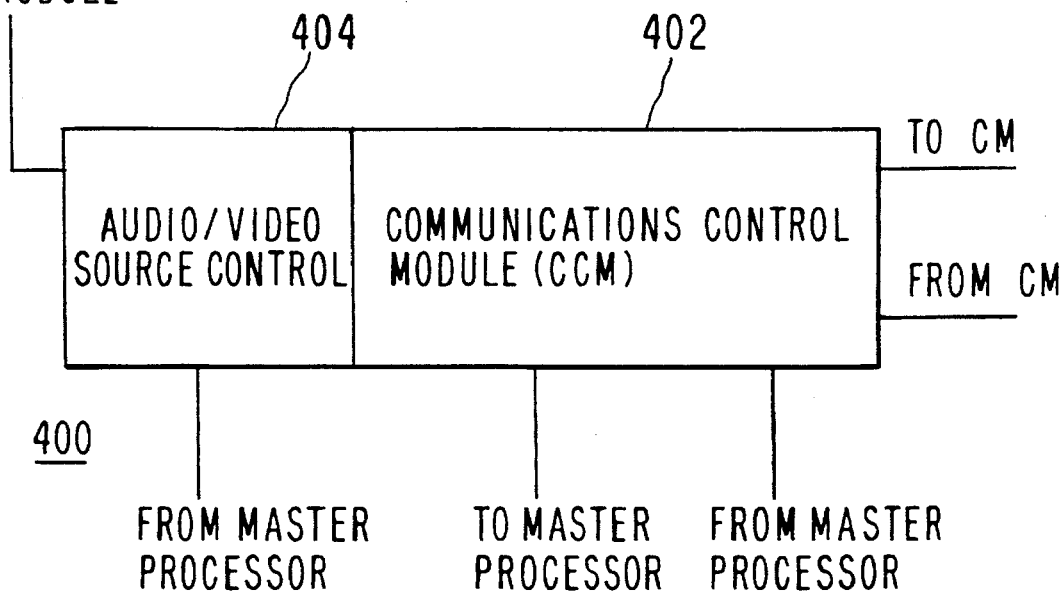
FIG. 5(a) illustrates the block diagram of the controller module of FIGS. 1 and 2.
Figure 5B:
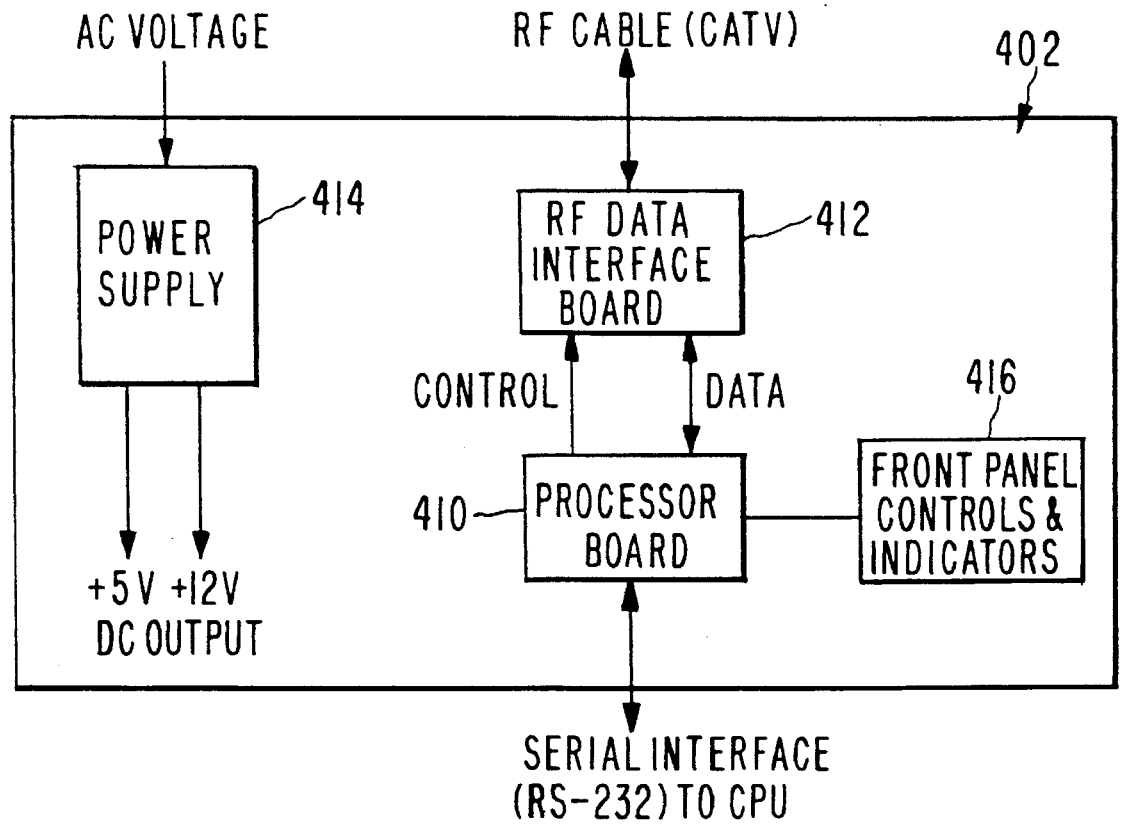
FIG. 5(b) illustrates the elements of the communications control module in the controller of FIG. 5(a)

Controller 204 of FIG. 2 communicates with all ICMs via communications module 350. It relays the requests received from any of the ICMs to master processor 300 as shown in FIG. 3. FIG. 5(a) illustrates the block diagram of controller 204 of FIG. 2. Controller 400 includes Communications Control Module ("CCM") 402 and VCR control 404. FIG. 5(b) illustrates the block diagram of CCM 402. CCM 402 includes processor board 410, RF data interface board 412, power supply 414, and front panel control and indicator 416. The master processor communicates with CCM 402 via a standard serial port (RS-232C). CCM 402 Send the user requests to the master processor and receives directions from the master processor. CCM 402 uses RF signals generated by RF data interface board 412 to communicate with each ICM.

When CCM 402 communicates with ICMs 206 of FIG. 2, it transmits a message that is addressed to a specific ICM, a selected number of ICMs, or all of the ICMs. In the former, only the ICM addressed responds to the message by transmitting the proper reply message to CCM 402 and ICMs not addressed will keep their transmitters disabled to avoid message collision. In the latter case, the message affects all the ICMs and is transmitted via the broadcast channels.

Processor board 410 handles all communications from and to individual ICMs through RF data interface board 412. It receives the requests from ICMs and responds to them according to the directions received from master processor 300 as shown in FIG. 3. Processor board 410 contains two Universal Asynchronous Receiver and Transmitters ("UART") which are not shown in FIG. 5(b). Both UARTs may be integrated with the microprocessor chip used by processor board 410. The first UART allows CCM 402 to communicate with ICMs 216 of FIG. 2; and the second UART allows CCM 402 to communicate with master processor 300 of FIG. 3 through the CPU interface on the processor board. The processor board further contains RAM and EPROM memories. The control program for the processor board is stored in the EPROM. The RAM is used for temporary data storage. Processor board 410 also provides signals for front panel control and indicator 416.

RF data interface board 412 provides the communications capability in CCM 402. It consists of two sections, a transmitter and a receiver which are not shown in FIG. 5(b). The receiver converts RF signals received from any ICM to digital signals. These digital signals are then passed to processor board 410. In the other direction, the transmitter transmits the digital information received from processor board 410 to all ICMs or to the addressed ICMs via communications module 350 as shown in FIG. 4. The digital information out of the transmitter is modulated using the Binary Frequency Shift Keying ("BFSK") modulation technique. This modulation technique is well known to one knowledgeable in the art, and will not be explained herein. RF data interface board 502 transmits the data using a carrier signal with the center frequency of 74.4 MHz and receives signals on a carrier signal with the center frequency of 23 MHz.

Front panel control and indicator 416 contains LEDs to indicate the status of CCM 402. Power supply 414 receives external AC voltage (120/220 V) and converts it to DC supply voltages for the electronic circuitry. Power supply 414 can be turned on or off via a power switch located on the front panel control and indicator 416.

Figure 5C:
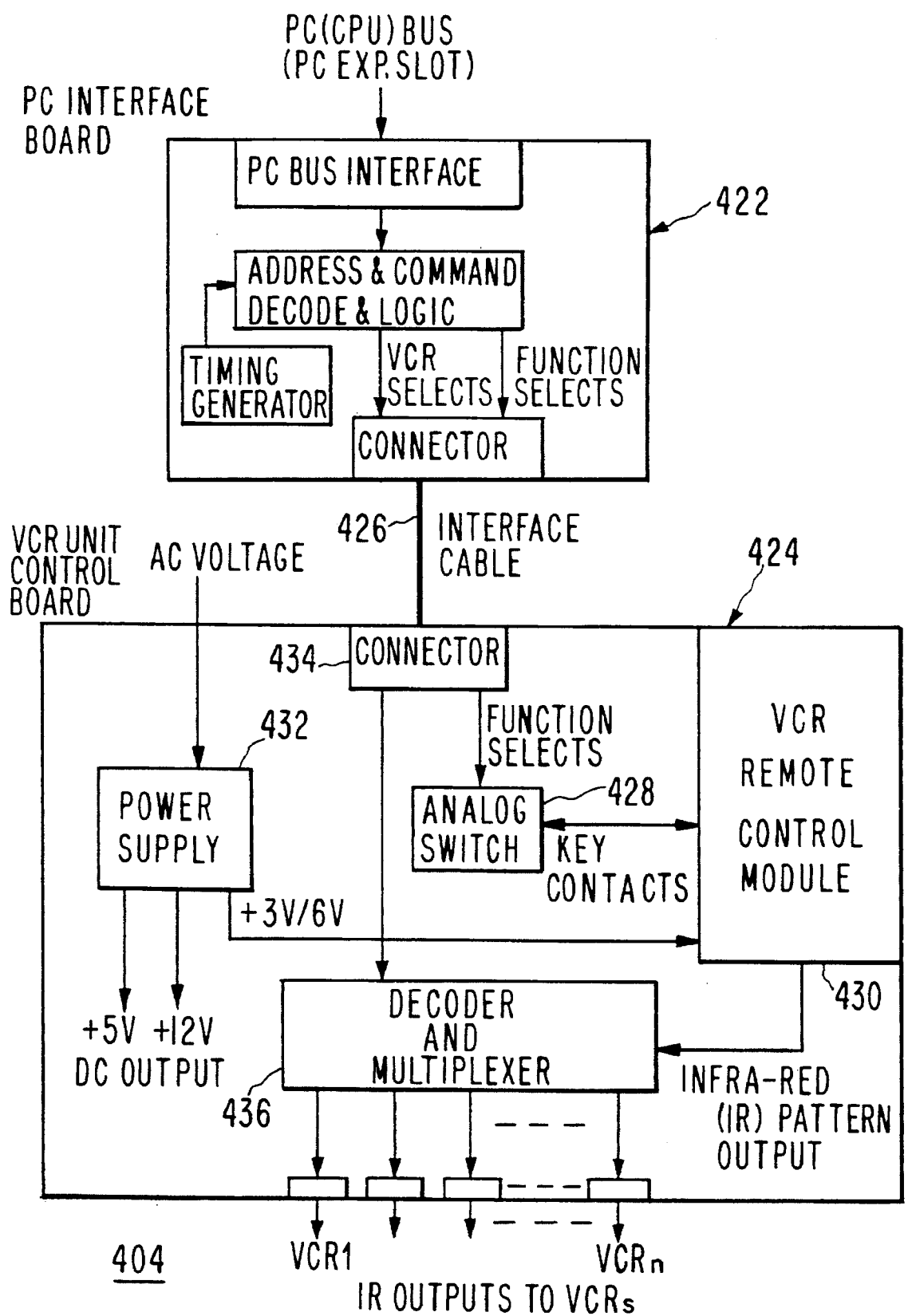
FIG. 5(c) illustrates the elements of the audio/video source control in the controller of FIG. 5(a)

FIG. 5(c) illustrates an audio/video control 404 which controls the audio/video sources (e.g. VCRs). The audio/video sources are located in the audio/video module 214 of FIG. 2. Audio/video control 420 consists of two separate boards, PC interface board 422 and audio/video unit control board 424. PC interface board 422 plugs into the motherboard of master processor 300 and provides a communications interface between master processor 300 and audio/video unit control board 424. PC interface board 422 receives the commands from master processor 300 and decodes the commands to determine which audio/video source is addressed and which function is selected (e.g. play, stop, rewind, pause, etc.). It then conveys the address and command information to audio/video unit control board 424 via interface cable 426.

Audio/video unit control board 424 includes analog switch 428, remote control 430, power supply 432, connector 434, and decoder and multiplexer 436. The audio/video unit control board is located in the audio/video control module of CCM 402. The information received from PC interface board 422 is routed to analog switch 428. Analog switch 428 sends the signal representing the requested function to remote control 430. Remote control 430 generates an infrared signal corresponding to the signal received from analog switch 428. Remote control 430 is an actual standard remote control unit corresponding to the brand of the audio/video source used in the system of the present invention. It is modified to provide an interface between its keypad contacts and the output of analog switch 428. The infrared signal is then routed to decoder and multiplexer 436. Using the address information, decoder and multiplexer 436 sends the infrared signal generated by remote control 430 to the selected audio/video source. It should be noted that as the brand/type of audio/video source changes, only the remote control unit must be updated in audio/video control 404. Power supply 432 converts the external AC voltage (120/220 V) to DC supply voltages for the electronic circuitry.

Figure 6:
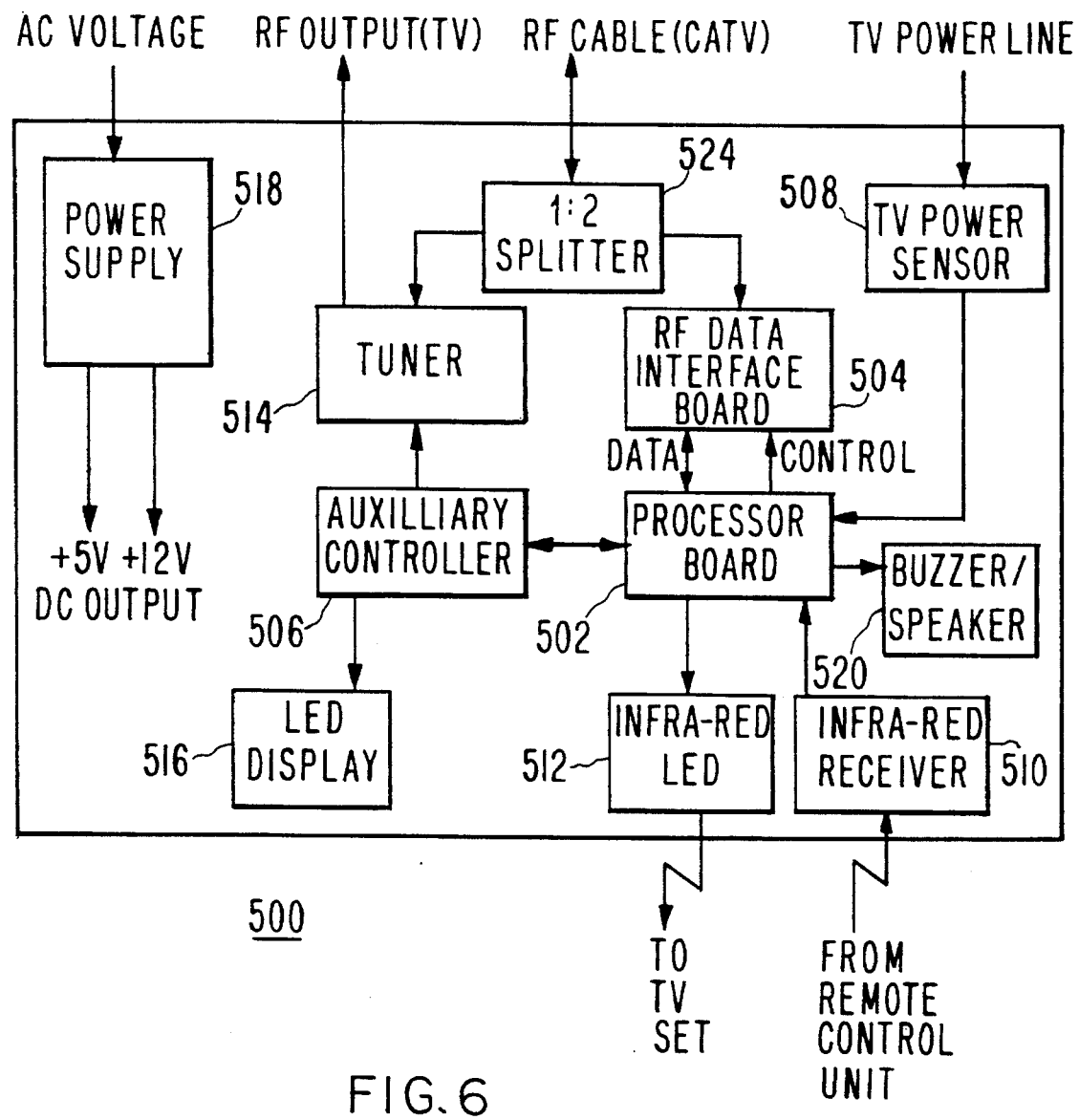
FIG. 6 illustrates the elements of each ICM of FIGS. 1 and 2.

FIG. 6 illustrates the block diagram of a typical ICM as shown in FIG. 2. ICM 500 includes processor board 502, RF data interface board 504, auxiliary controller 506, TV monitor power sensor 508, infrared receiver 510, infrared LED 512, tuner 514, LED display 516, power supply 518, and buzzer/speaker 520. ICM 500 is used in conjunction with a TV monitor to provide the user with the means to communicate with the system. ICM 500 communicates to the rest of the system through communication module 350 in FIG. 4. ICM 500 is connected to the communication module 350 via coaxial cables as illustrated by trunk 1 and trunk 2 in FIG. 4.

Processor board 502 makes all the decisions in ICM 500. The decisions are made in response to the commands received from the user or from CCM 402. When ICM 500 receives a request from the user, processor board 502 transmits this request to CCM 402 upon being polled by the CCM. When the processor board receives a command from CCM 402, it directs the TV monitor or the other sections of the ICM to perform a function according to that command. For example, it tells the rest of the circuitry in ICM 500 to tune the TV monitor to a particular channel.

Processor board 502 communicates with CCM 402 through RF data interface board 504. The communications between processor board 502 and RF data interface board 504 is done via a UART which may be integrated with the microprocessor chip on the processor board. Processor board 502 further includes RAM and EPROM memories, an infrared transmission circuit for TV monitor control, and ICM address select circuits which are not shown in FIG. 6. The EPROM is used to store the control program for the processor and the RAM is used for temporary data storage.

The infrared transmission circuit sends modulated infrared signals to control the TV monitor. Finally, the ICM address selects a unique address for the individual ICM. The unique address enables CCM 402 to address each ICM independently via the common transmission media.

The RF data interface board 504 consists of two sections, a transmitter and a receiver, which are not shown in FIG. 6. The receiver converts the information received from CCM 402 to digital signals, then passes the digital signals to processor board 502 for further processing. The transmitter transmits the digital information received from processor board 502 to the CCM via the communication module 350. The digital information out of the transmitter is modulated using the Binary Frequency Shift Keying ("BFSK") modulation technique. RF data interface board 504 transmits the data using a carrier signal with the center frequency of 23 MHz and receives signals on a carrier signal with the center frequency of 74.4 Mhz.

Auxiliary controller 506 controls the peripheral circuits in ICM 500. The peripheral circuits are TV monitor power sensor 508, infrared receiver 510, infrared LED 512, tuner 514, LED display 516, and buzzer/speaker 520. It controls these circuits in response to a command from processor board 502.

Tuner 514 tunes the TV monitor to the desired channel for displaying the service requested by the user. LED display 516 shows the channel number and/or other messages. Buzzer/speaker 520 provides audio feedback signals to indicate to the user that the request is being processed by the system. TV monitor power sensor 508 constantly checks the TV monitor to determine whether it is off or on. If the TV monitor is off, the system is capable of turning the TV monitor on during emergencies. This capability enables the system to communicate with the user even if the TV monitor is off.

Power supply 518 converts the external AC power (120/220 V) into DC supply voltages to be used by the electronic circuitry of ICM 500. It also provides AC to turn the TV monitor on or off under the control of auxiliary controller 506.

FIG. 7(a)–7(d) illustrate various embodiments of the audio/video module used in the present invention. Before describing the audio/video module, the following discussions would be beneficial to understanding how the audio/video module functions. Each audio/video signal is modulated by a carrier frequency. The carrier frequency must be within a frequency span allocated to a particular channel. This frequency span is set by the Federal Communication Commission ("FCC") and are used throughout the broadcasting world. The standard frequency span is 6 MHz. For example, channel 14 corresponds to the signals transmitted using a carrier with a center frequency between 120 to 126 MHz. FIG. 8 contains the frequency ranges for each channel from channel 14 to channel 43.

Coaxial cables are used for transmitting signals to different locations in an establishment. The quality of the cables used sets the maximum channels available to the system via the particular module. Higher quality cables provide less noise at higher frequencies. Accordingly, the higher the quality of the cable, the higher the number of channels available, limited by the current coaxial cable technology. Locations that use the present invention (e.g. hotels, hospitals, etc.) typically use lower quality cables for transmission purposes. These cables have good frequency characteristics up to 350 MHz. Although signals with frequencies up to 580 MHz may be transmitted via these cables, they are usually heavily corrupted by noise. Accordingly, channels 43 and below are used to transmit signals.

In the present invention, out of the 43 channels available for transmission, channels 1 through 13 are used to provide local channels, satellite channels, or local cable channels. Out of the remaining 29 channels, some (typically 5) are allocated to broadcast the information generated by the system of the present invention and the rest are allocated to transmit the signals generated by the audio/video sources and the video graphics controller.

Returning to FIG. 7(a), it illustrates a block diagram of a typical audio/video module used in the present invention. Audio/video module 600 includes audio/video Sources 602, video graphics controller 604, baseband switching matrix 606, RF modulator groups 610, and RF combiners 612. VCRs and video cameras are typical audio/video sources used in the system of the present invention. Audio/video module 600 transmits audio/video signals in response to a request from either master processor 300 or slave processors 316 in FIG. 3 or controller 400 in FIG. 5(a). The signals generated by the audio/video module 600 are transmitted to ICM 600 via communications module 350 in FIG. 4.

Depending on the request by the user, audio/video module 600 generates three types of signals. Obviously, other sources can be added to generate additional types of signals. The three types of signals are a movie, a service that requires graphics signals generated by the video graphics controller 604, or the signals of the local channels, the satellite channels, or the local cable channels. If a movie is requested, the corresponding audio video source (e.g. a VCR) is triggered to provide the requested movie. Obviously, each audio/video source can show one specific movie. If requests require graphics, the master processor commands video graphics controller 604 to generate the necessary graphics. Finally, a user can request access to the local channels, the satellite channels, or the local cable channels which are always available to the user when the system operates in "TV monitor" mode. Once any of the other two types of signals are generated, they are modulated by a modulator group 610. The modulated signal is then sent to the requesting ICM via the combiners 612 and communications module 352 of FIG. 4. Each modulator group can include any number of individual modulators, and typically include 25 individual modulators. One individual modulator is allocated to every channel. Individual modulators modulate the signal at their input according to the frequency requirements of their respective channels. For example, modulator 20 modulates the signal at its input using a center frequency used for the channel 33 (e.g. 276 to 282 MHz). Hereinafter, modulators and channels are used interchangeably, although they are not the same.

The complexity of the audio/video modulator 600 depends on the number of users assigned to a trunk group (refer to the description of FIG. 4 for a definition of a trunk group). As the number of users increase, the system requires more modulator groups and more RF combiners. For an establishment with a smaller number of users, one modulator group may suffice.

Figure 7A:
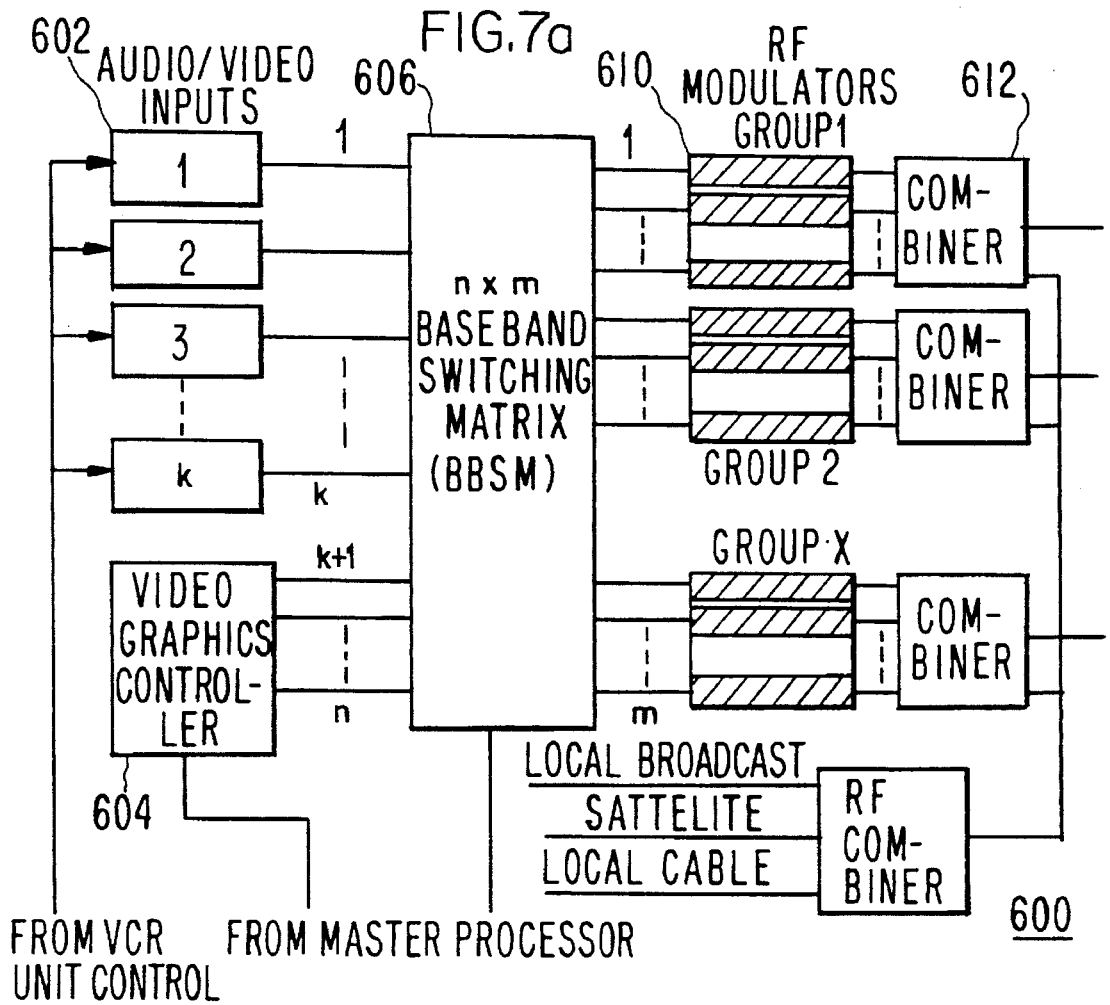
FIG. 7(a) illustrates the elements of a typical 10 audio/video module as shown in FIGS. 1 and 2.
Figure 7B:
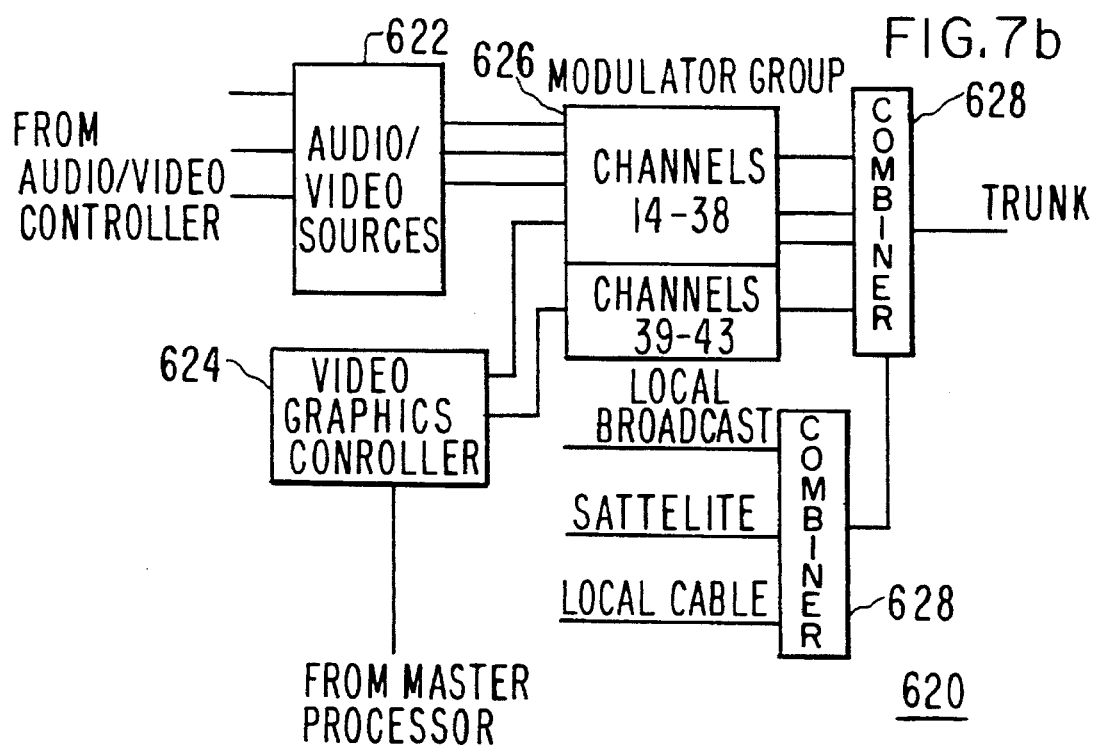
FIG. 7(b) illustrates the elements of an audio/video module of the system of the present invention that services less than 80 users.

FIG. 7(b) illustrates an embodiment of the audio/video module for a system that serves a small number of users. Audio/video module 620 includes audio/video sources 622, video graphics controller 624, modulator group 626, and RF combiners 628. Outputs of audio/video sources 622 and video graphics controller 624 are directly connected to the inputs of modulator group 626. Although a baseband switch matrix is not used here, it could be used if the system requires it.

Figure 7C:
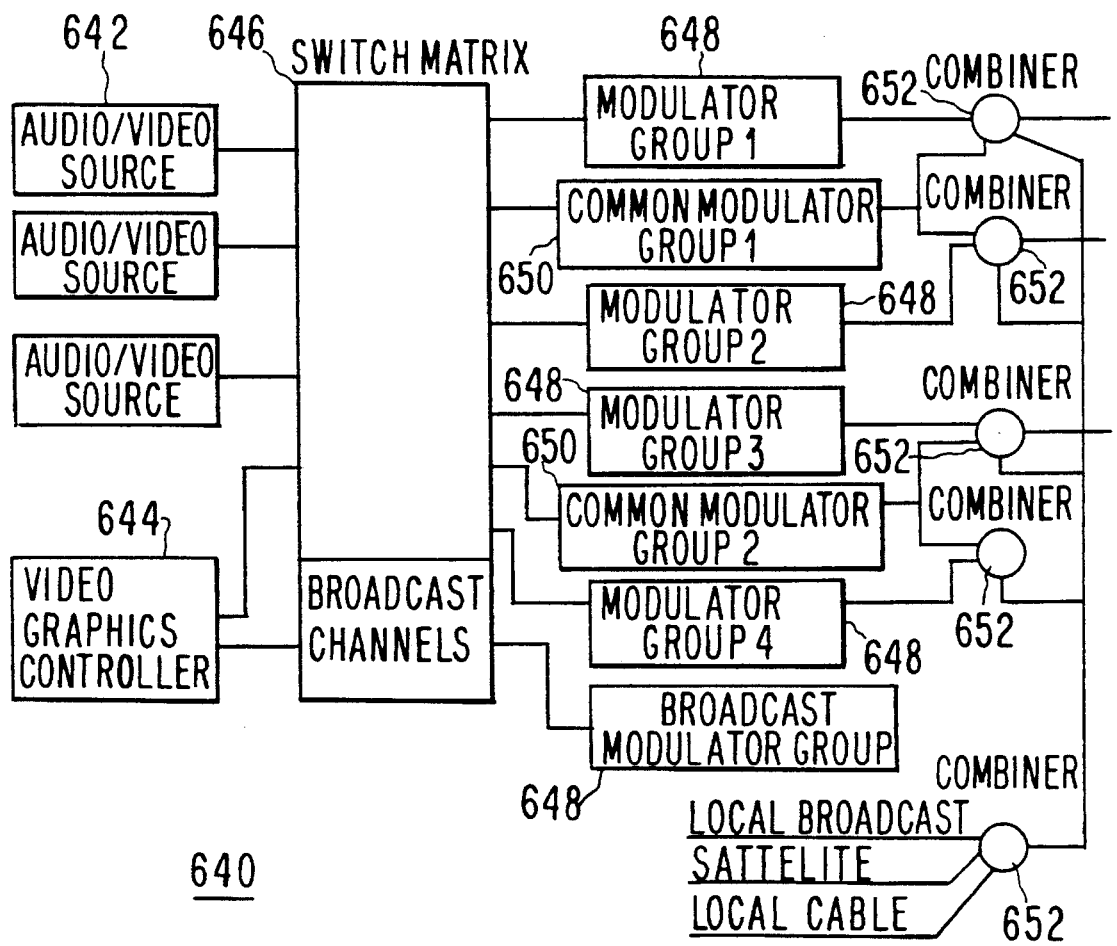
FIG. 7(c) illustrates the elements of an audio/video module of the system of the present invention that incorporates the "share architecture"

As the number of the users increases, more modulator groups must be added to the audio/video module, adding to the cost of the system. The present invention offers a unique solution to this problem. The software used in the present invention enables the individual modulator groups to share a group of common modulators as needed. This reduces the total number of fixed modulators used in each modulator group, hence reducing the total number of individual modulators used in the system. When all the individual modulators in any modulator group are being used, the software allocates additional modulators from the common modulator group to that modulator group. The additional modulators become available to other modulator groups when they are no longer being used. While the "share architecture" may be implemented without a switch, for a system serving a large number of users (typically above eighty users) a switch matrix must be used to effectively implement the "share architecture". In the present invention, the non-blocking baseband switch is used where the number of users exceeds eighty. The baseband switch also enables the system to connect the signal at any of its inputs to any of its outputs. The baseband switch will be described later. FIGS. 7(c) and 7(d) illustrate audio/video module 600 having more than one modulator group.

FIG. 7(c) illustrates a second embodiment of an audio/video module implementing the sharing architecture. Audio/video module 640 includes audio/video sources 642, video graphics controller 644, baseband switching matrix 646, modulator groups 648, common modulator group 650, and combiners 652. Each modulator group 648 has a number of fixed modulators and share the individual modulators in common modulator group 650. The number of modulators in common modulator group 650 depends on the requirements of the individual system. If modulator groups 648 are connected to high demand trunk groups, more fixed modulators must be allocated to them. This reduces the number of modulators in common modulator group 650. On the other hand, if modulator groups 648 are connected to low demand trunk groups, they need fewer fixed modulators, which results in a higher number of modulators in common modulator group 650. As far as the rest of the system is concerned, the audio/video module of FIG. 7(c) operates exactly the same as the audio/video module of FIG. 7(a). FIG. 7(d) illustrates one way of allocating individual modulators to a system with four modulator groups.

We will now discuss the baseband matrix switch used in the preferred embodiment of the present invention. Baseband matrix switch 606 of FIG. 7(a) is a single stage non-blocking matrix switch which enables the system to connect any signal at any of its inputs to any of its outputs. Therefore, if any input is available, it can be connected to any output. This increases the possibility of providing a requested service to the user. Obviously, if all of the channels in one trunk group is being used, that trunk group cannot serve any other user connected to it. However, the possibility of such an occurrence is very small. The number of users assigned to a trunk group depends on the usage of that group for a given installation. For example, under low originating traffic conditions (i.e. fewer requests for services from the users), more users are assigned to that trunk group. Similarly, for high originating traffic conditions, the number of users per trunk group is reduced. This is done to ensure a more uniform service to all users under all conditions. In general, the service criteria used in tailoring a system for an installation means that no more than 2% of all users are denied a service, provided the requested service is available. The non-blocking network helps in the establishment of the service criteria used; of course, other criteria could be used and the system engineered accordingly. The non-blocking network enhances the grade of services offered. On the other hand, in the systems that use blocking switch networks, once the switch output allocated to a number of switch inputs is being used, the rest of the inputs cannot be accessed.

FIG. 9(a) illustrates a typical embodiment of a non-blocking switch matrix. Matrix 800 includes matrix control 810 and switch matrix 820. Matrix control 810 includes connector 812, addressed command decoder 814, and power supply 816. Matrix control 810 receives an instruction from master processor 300 of FIG. 3. Master processor 300 communicates with matrix control 810 via CPU control interface cable 830. The instruction from the master processor 300 contains addressing and control information. The addressing and control information is received through connector 812 and is passed to address and command decoder 814, which in turn separates the address and command parts of the information and uses them to connect the addressed input to the addressed output. The output of address and control decoder 814 is connected to the select input (not shown) of each switch in each 16×M matrix card. This enables the system to select and connect any input to any output on the matrix card.

Switch matrix 820 consists of 16×M matrix cards 822 and connector 824. Each 16×M matrix card 822 has 16 inputs and M outputs. Any input of each 16×M matrix card 822 can be connected to any of its outputs, making the matrix card a 16×M non-blocking switch matrix. To create an N×M switch matrix, N/16 matrix cards are used, with each matrix card having 16 different inputs. To convert the above N×M switch matrix to a non-blocking switch matrix, each output of each 16×M matrix card 822 is multiplied with the respective output of the other 16×M matrix card in connector 824. Finally, the M outputs of connector 824 are the outputs of the switching matrix.

Figure 9B:
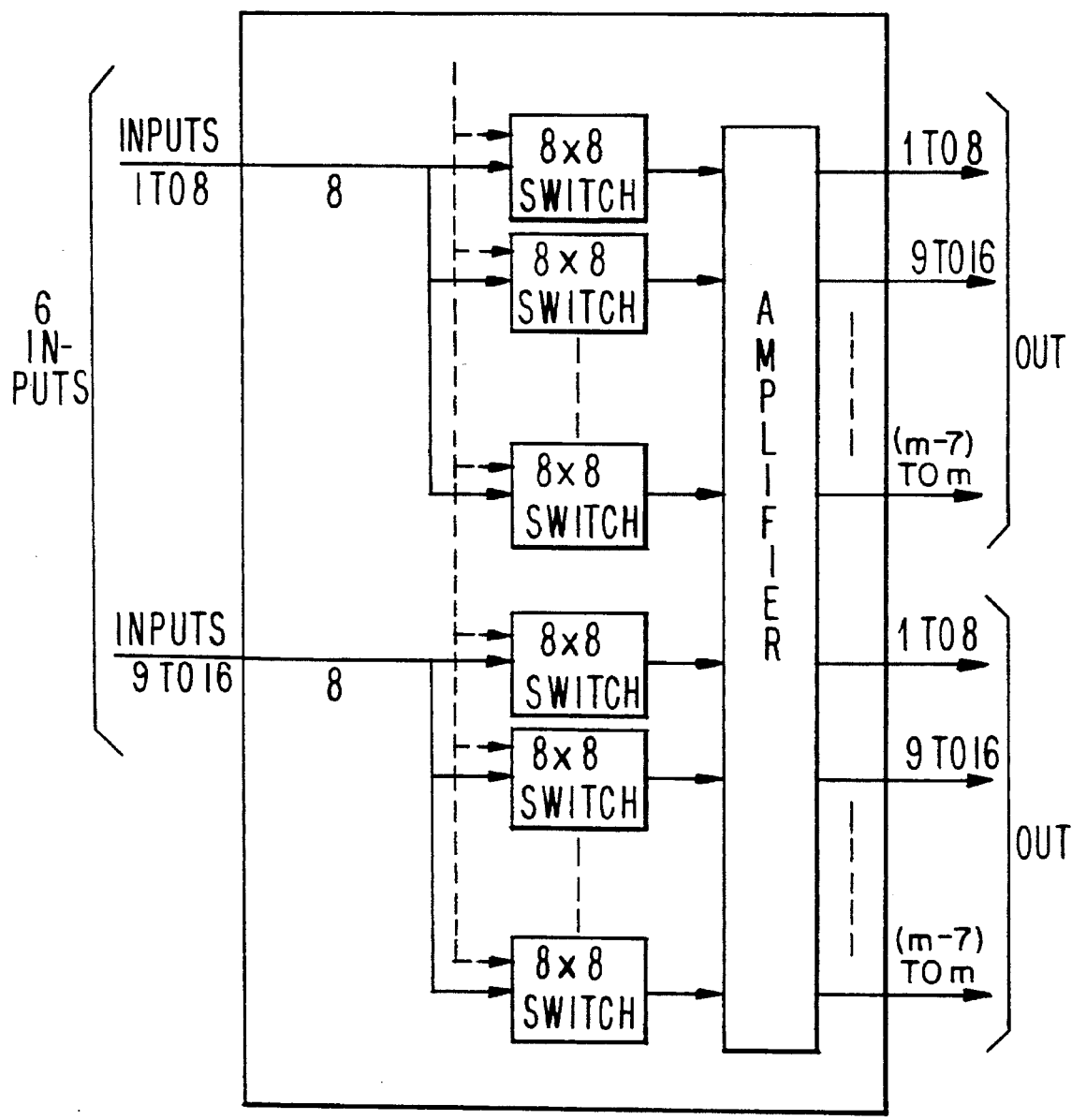
FIG. 9(b) illustrates the elements of each 16xM matrix board.

FIG. 9(b) illustrates one method of designing 16×M matrix card 822. Each 16×M matrix card 822 includes a number of 8×8 switch blocks. Each 8×8 switch block has eight individual switches (not shown), and are designed such that any input can be connected to any output (i.e. a non-blocking 8×8 matrix. To create an 8×M matrix, the same 8 inputs are connected to M/8 8×8 switch blocks. Accordingly, an 8×M non-blocking switch matrix is constructed with 8 inputs and M outputs. Hence, any input can be connected to any output. To create a 16×M non-blocking matrix, two 8×M non-blocking matrices are used with each output of the first 8×M matrix connected to every output of the second 8×M matrix. Obviously, the above example is only one method of designing a non-blocking switching network. Other variations are hereby included in this application.

Finally, the outputs of the individual modulators in each modulator group are connected to the inputs of the RF combiners 612. Furthermore, the output of the RF combiner 612 carrying the local broadcast, the satellite broadcast, and the local cable signals is connected to the input of the rest of the RF combiners. The RF combiners combine the input signals and send them to the respective trunk group in communication module 350. The signals are then transmitted to the ICMs via trunks 1 and 2 corresponding to each trunk group. The operation of the RF combiners are known to one knowledgeable in the art.

Figure 10:
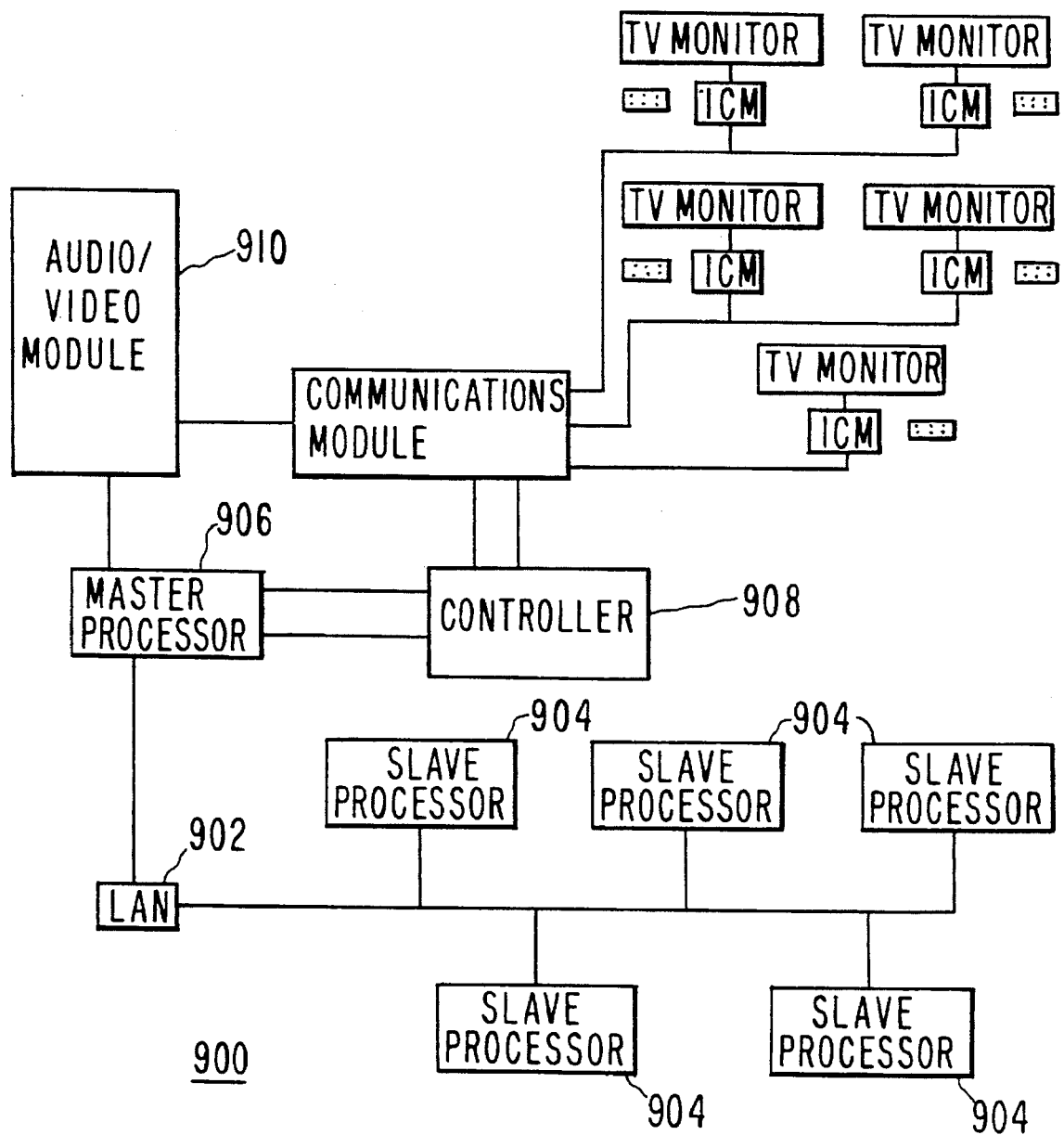
FIG. 10 illustrates an embodiment of the present invention using slave processors to handle each of the services offered by the system of the present invention.

FIG. 10 illustrates a third embodiment of the present invention. In addition to the elements of the system in FIG. 2, system 900 includes LAN 902 and slave processor 904.

Although master processor 906 is capable of fast processing, the speed of the system can be further enhanced by adding the slave processors. In system 900, each slave processor 904 is in charge of one service offered by the system. Once master processor 906 receives a request, it determines which service is requested and then asks the responsible slave processor 904 to respond. The responsible slave processor responds by sending the necessary information to master processor 906. Finally, master processor 906 sends the necessary commands and information to controller 908 and audio/video module 910. Controller 908 and audio/video module 910 respond to the commands using the information from the master processor as previously described. However, if the system manager requests administrative or maintenance service from the system, the master processor, after receiving the requested information from the slave processor via the LAN, either prints out the requested data or displays it on a specific monitor used by the system manager. In addition to increasing the realtime speed, the addition of slave processors 904 increases the reliability of the present invention. If any of the slave processor 904 malfunctions, the respective service will be discontinued. The rest of services will continue to be offered to the user as if nothing has happened. Meanwhile, the malfunctioning processor can be replaced or fixed to add the service back onto the system. Accordingly, the probability of having all of the system down is reduced tremendously.

The present invention further includes proprietary software that enables the system to operate. The software consists of three major subprograms: I) a central control complex program; II) an in-room controller program; and III) a set of application programs. The central control complex program controls the operation of the master processor, the controller, and the audio/video module. The in-room controller program controls the operation of the ICMs. One copy of the in-room controller program resides in the memory of the processor board in each ICM. Finally, the application programs enable the system to provide different services. For example, there is one application program for handling requests for wake-up calls. The application programs reside either in the memory of the master processor of the first and second embodiments, or in the memory of the slave processors of the third embodiment. We now describe each individual subprogram.

I). The Central Complex Control Program

Figure 11:
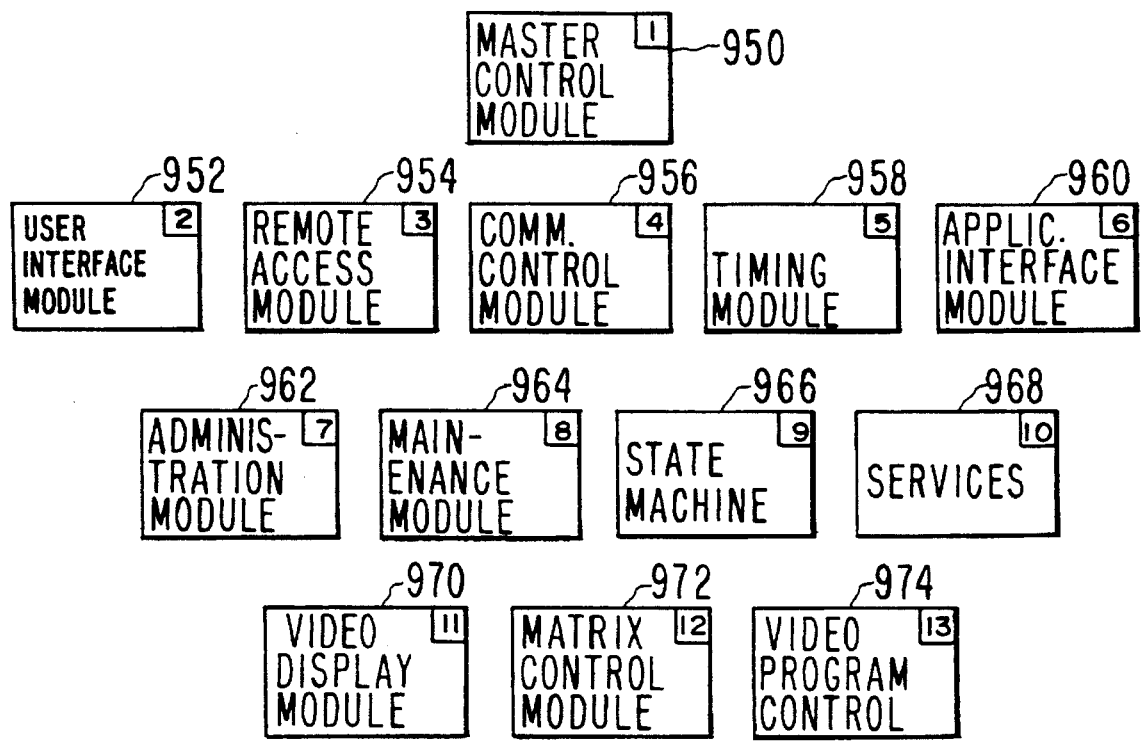
FIG. 11 illustrates the program modules in the central control complex program.

The central complex control program runs on a multi-tasking operating system. It may run on a master processor or be distributed over a multiple of slave processors via a LAN. It consists of thirteen modules as shown in FIG. 11. They can be categorized in four classes: master control, systems tasks, operation, and peripheral control.

The master control category includes master control module 950 which initializes the database, and starts the five modules in the system tasks category.

The system tasks category includes five modules: 1) user interface module 952; 2) remote access module 954; 3) communications control module 956; 4) timing module 958; and 5) application interface module 960.

In the system task category, user interface module 952 allows on-line access via a keyboard for administration and maintenance activities. Remote access module 954 provides the capability of remote processing for administration and maintenance activities. Communications control module 956 monitors messages from the ICM and responds to the ICM after processing the message. This module is stored in the EPROM of the processor board 410 of FIG. 5(*b*). Timing module 958 tracks the system time, and handles all the timing tasks for the system. Application interface module 960 communicates with external applications, such as a message center.

The operations category includes four modules: 1) state machine module 962; 2) administration module 964; 3) maintenance module 966; 4) services module 968.

In the operations category, state machine module 962 handles the state transitions triggered by the ICM input. Administration module 964 handles the task of inquiring and configuring the system database. Maintenance module 966 provides the capability to diagnose any problems in the system, to enable and disable any part of the system, and to inquire about the status of various parts in the system. Services module 968 provides value-added features, e.g. wake-up and breakfast ordering services, to the user.

The peripheral control category includes three modules: 1) video display module 970; 2) matrix control module 972; 3) video program module 974. Video display module 970 provides the capability of displaying various screens on the TV monitor. Matrix control module 972 handles the task of setting and resetting the cross-points in the switch matrix. Video program module 974 handles the task of controlling the audio/video sources.

Figure 14:
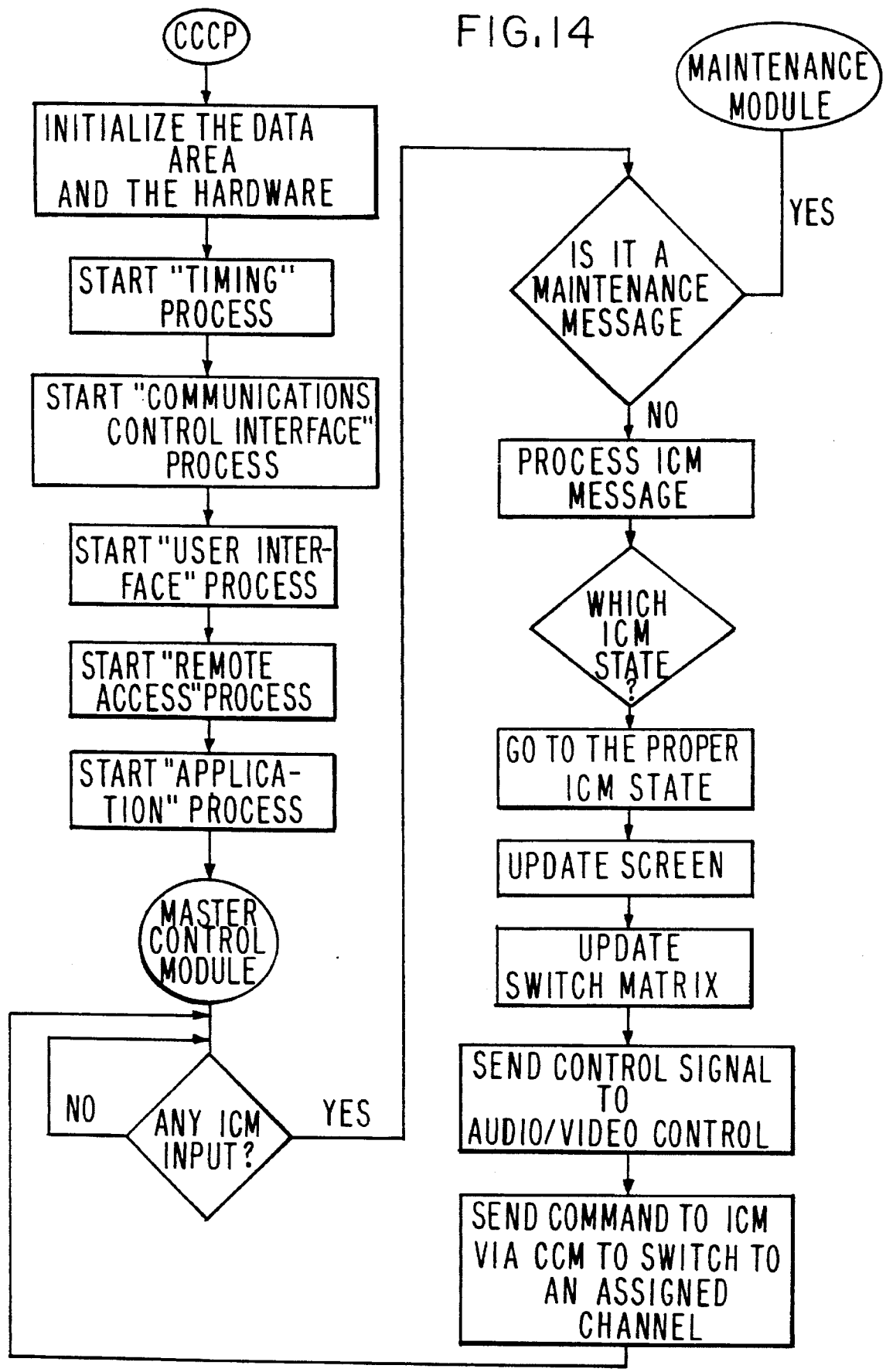
FIG. 14 is a flowchart illustrating how the CCC program operates.

FIG. 14 is a flowchart illustrating how the CCCP operates.

II). The In-Room Controller Program

Figure 12:
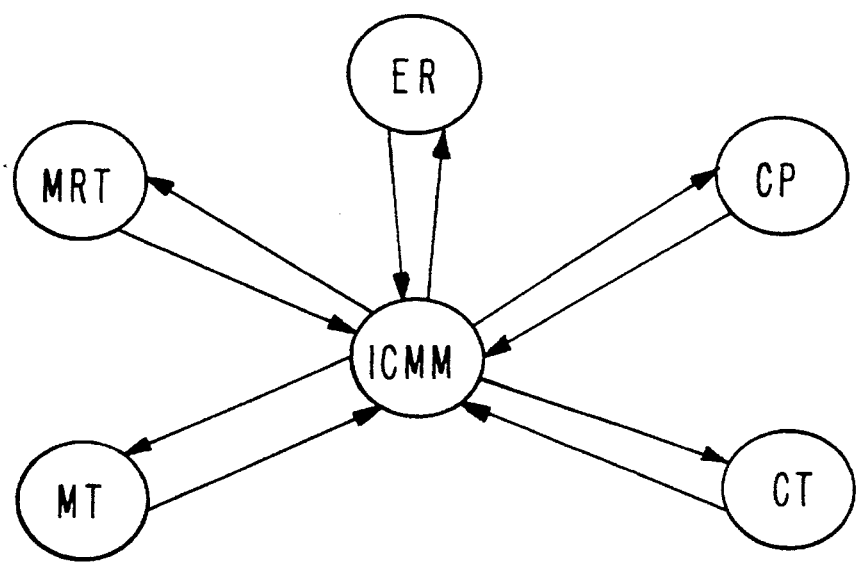
FIG. 12 illustrates the program modules in the ICM program.

The in-room controller program utilizes a multi-tasking architecture which consists of an ICM master module, an Error Reset ("ER") module, a Messaging Received and Transmit ("MRT") module, a Messaging Timer ("MT") module, a Command Processing ("CP") module, and a Command Timer ("CT") module, as shown in FIG. 12. The in-room controller program controls each ICM and enables them to interface with the CCM through the RF data interface board. Furthermore, it enables each ICM to interface with the respective handheld unit and the TV monitor. Each individual module is in charge of performing a specific task. FIG. 12 denotes each module by a circle with IN and OUT arrows representing the direction of the data. The IN arrows originate from the ICM master module, which is denoted by the center circle, and represents the data out of the ICM master program. The OUT arrows originate from individual modules and represent the data out of the individual modules. The function of each module next is hereinafter described.

The ICM master module ("ICMM") continuously monitors the status of the system and reacts if it detects an unusual situation. The ICMM reacts when it detects a cold error or when it detects a hot error. The cold error occurs when a user turns the power on. Upon detecting the cold error, ICMM asks the ER module to reset the particular ICM to its initial condition. In the initial condition, the TV monitor is tuned to a specific free channel (typically channels 3 or 4) and the ICM is ready to receive a request from the user. Once the ER module initializes the ICM, the ICMM module informs the master processor that the ICM is initialized. Since each ICM must be initialized at power up, the master processor asks the ICMM module to continue the normal operation. The "hot error" is an error detected during the processing of a request. If the ICMM module detects an error during processing of a request, e.g. a second digit is not detected after a first digit, it again directs ER module to reinitialize the ICM and sends a message to the master processor that the ICM has been initialized. This time, the master processor responds by asking the ICMM module to reset the ICM to the operating state of the ICM before the occurrence of the error. All of the above communications with the master processor is done through the CCM. Furthermore, the communication control module 956 of FIG. 11 is in charge of the communications from the master processor's side.

The Messaging Receive and Transmit ("MRT") and Messaging Timer ("MT") modules handle the communications with the CCM. The CCM transmits two types of information packets to the ICM: (1) the interrogating packet, and (2) the command packet. The command packet contains the information about the new channel assignment. The MRT module uses the information in the command packet to tune the ICM to the selected channel. The interrogating packets are sent to inquire whether any of the ICMs have received a request form the user.

Furthermore, the MRT transmits a reply packet in response to the interrogating packet sent by the CCM. The reply packets contain one of three types of information: (1) a request received by the in-room controller program, (2) an error generated by the ER module, or (3) a "no message". The MRT module expects to receive a packet of information from the CCM within a fixed interval and if it does not, the MT module generates a command to restore the status of the ICM to the status prior to receiving an interrogating packet.

The Command Processing ("CP") and Command Timer ("CT") modules decode and process the commands received through the RHU. The CP module receives and decodes the information from the RHU. If the information from the RHU represents a digit, the CP module expects a second digit from the RHU within some preset interval. Please note that each service offered is represented by a two digit code within its corresponding menu. If the second digit is received within the above interval and the ICM is in non-TV monitor state, the two digit information is buffered and sent to the CCM by MRT module. On the other hand, if the ICM is in TV monitor state, the two digits represent a requested channel and the TV monitor is tuned accordingly. If the CP module does not receive the second digit within the preset interval, the CT module resets the CP module to its state before receiving the first digit. If the information from the RHU is decoded to be a command from the RHU rather than a digit, that command is either executed, e.g. increase the volume, or it is sent to the CCM by the MRT module, e.g. movie, services, etc.

Figure 15:
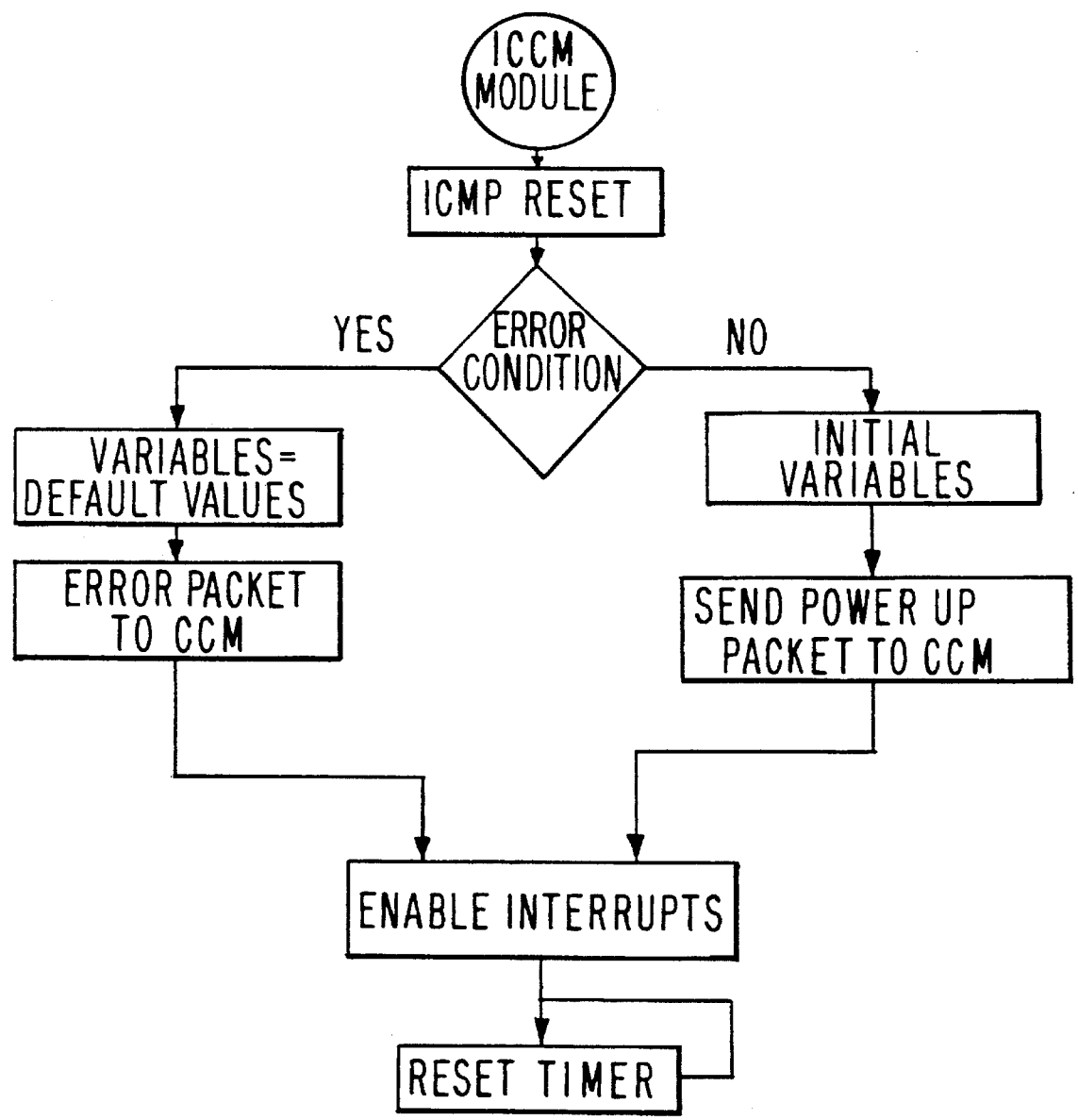
FIG. 15 is a flowchart illustrating how the ICMM module of the ICM program operates.
Figure 16:
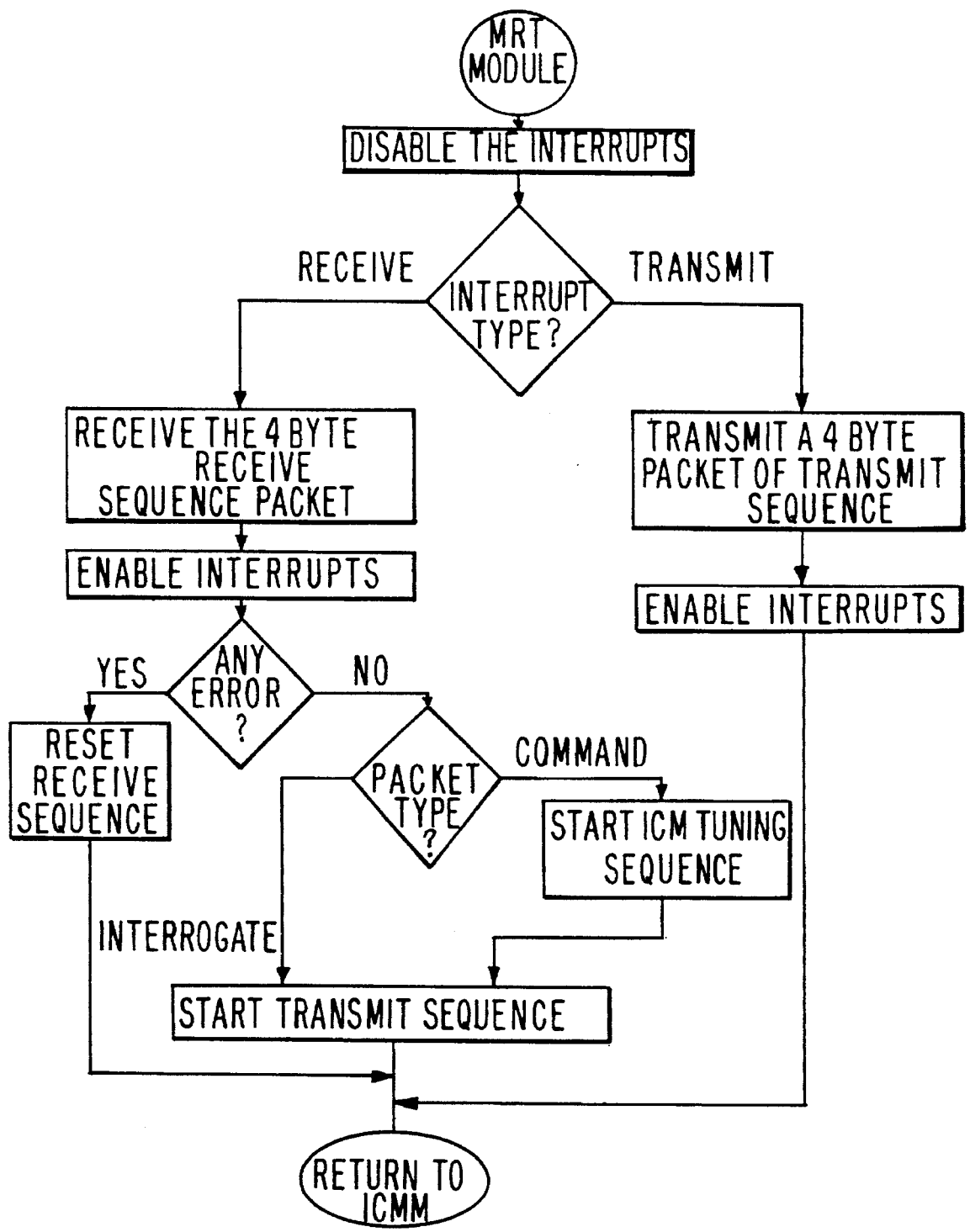
FIG. 16 is a flowchart illustrating how the MRT module of the ICM program operates.
Figure 17:
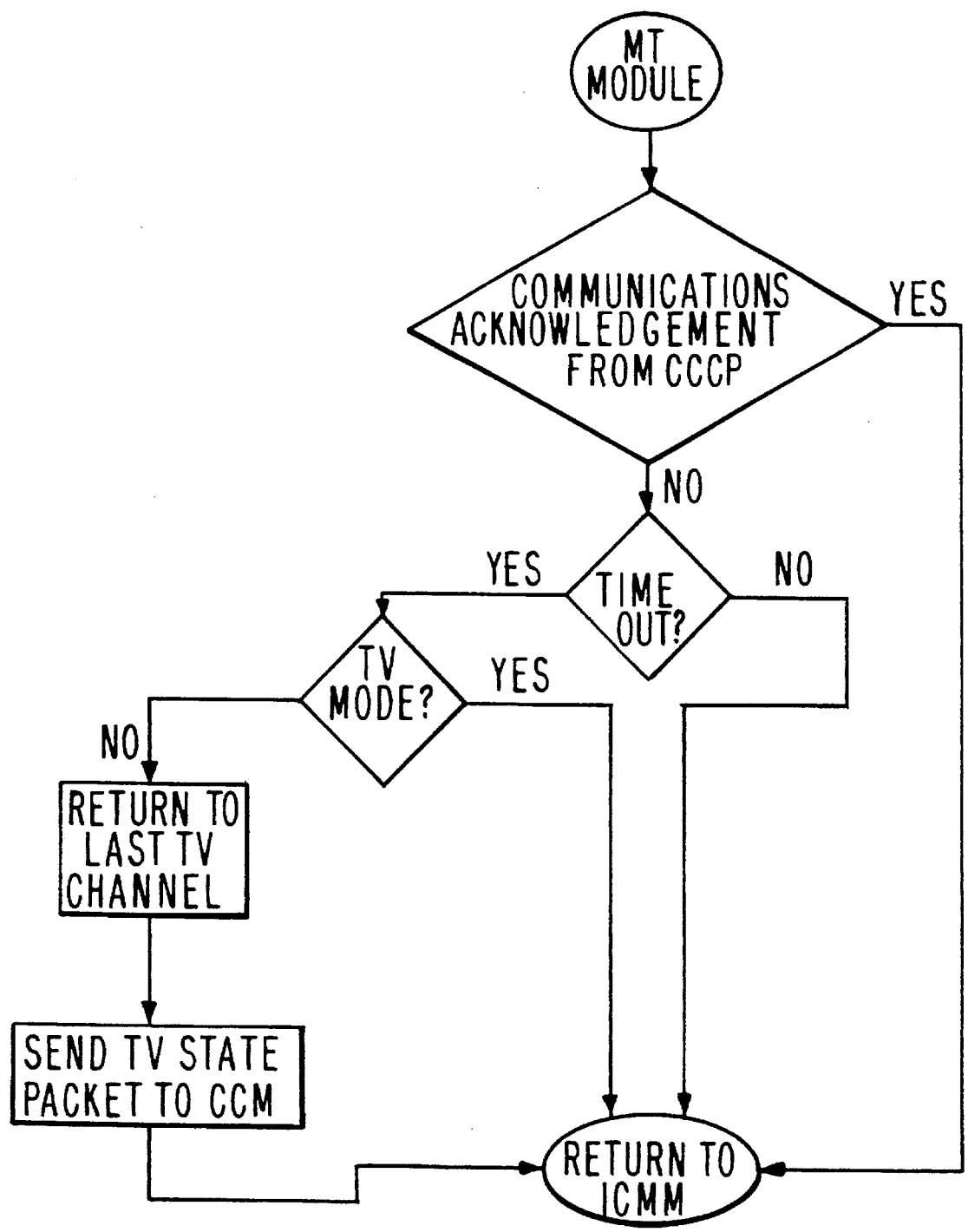
FIG. 17 is a flowchart illustrating how the MT module of the ICM program operates.

FIGS. 15-17 are flowcharts illustrating how the ICMM, MRT and MT modules of the ICM program operate. Since the flowcharts of FIGS. 15-17 are typical illustrations of the program modules in the ICM program, there is no need for additional flowcharts illustrating the remaining program modules.

III). The Application Programs

The third subprogram includes the individual application programs. Each application program handles one service offered by the system of the present invention. Once the master or slave processor determines which service is requested, the corresponding application program generates the necessary commands and information for the requested service. The generated commands and information are used by the CCM and audio/video module to provide the service.

Examples of Services Offered

The system of the present invention is capable of, but not limited to, offering the following services:

Retrieval of information from the management system of the establishment

Facsimile

Room to Room Messaging

Hotel Map

Reservation of Recreational Facilities

Calendar of Events

On-Line Promotion

Room Status

Multilingual Services

Special Guest Advisory Channel

E-Mail from Patron Organizations (the system only receives E-Mail from outside)

Video Communications

Bypassing the Local Phone Company's System for long distance calls

By way of example, the following services will be described next: 1) selection of a movie; 2) requesting a wake-up call; 3) telephone message service; 4) video communications services; 5) retrieval of information from the management system; and 6) bypassing the local phone company's system.

1. Selection of a Movie

The user selects movie services by pressing the "movie" button on the RHU. The request enters the system as previously explained. Once the system determines that the movie services selection has been requested, the movie application program stored either in the memory of the master processor or the memory of the respective slave processor, displays a menu listing the different category of movies, e.g. drama, western, comedy, adult, etc. Each category has a double digit code associated with it. Once the user selects a category by depressing the buttons corresponding to each digit on the RHU, the movie application program checks to determine whether there are any movies available in the selected category. If there are movies available in that category, a menu containing the list of movies will be displayed on the TV monitor. Again, each movie selection has a double digit code assigned to it. The user selects a movie by sending the code through the RHU. Once the movie application program receives the selection, it generates and sends the proper signals to ask the CCM to command the ICM to set the right channel on the TV monitor. It also commands the audio/video module to start the selected movie. Once the movie is finished, the movie application program sends a message to the audio/video module to rewind the movie and prepare the audio/video source for the next request for its movie. The user can be charged, in a pay-per-view system, either at the beginning of the movie or after a pre-selected interval from the beginning of the movie. The time interval can be set by the systems manager. If there are no movies available in that category, the software sends a message to the user informing the user that the selections in this category is temporarily not available.

When a movie is being viewed, it is removed from the respective menu by the movie application program. Once the movie is no longer being viewed, it is added back to the menu. Furthermore, the system provides the user with the option of blocking adult movies. Once the user selects this option, the movie application program blocks any selection from the adult category for a specific period of time, typically from 12:00 noon of the current day to 12:00 noon of the next day).

2. Request for a Wake-Up Call

The user must select the "services" selection from the initial menu to request wake-up calls. Once the system determines that the "services" selection has been made, it displays a menu listing all the choices in the "services" category. Again, each choice has an associated two digit code. The user selects the wake-up call selection by depressing the two digits corresponding to the code on the RHU. Once the system determines that a wake-up call service is requested, the wake-up call application program is accessed for further processing. The wake-up call application program displays a menu on the screen of the TV monitor which gives the user predetermined time intervals. The user next selects the time interval during which to receive the wake-up call, e.g. 10:00 a.m.–10:15 a.m. This information is stored in the system and a wake-up call is made to the user via the TV monitor at the beginning of the time period selected and at selected intervals until the end of the time interval is reached.

3. Phone Messaging Service

The system of the present invention also provides a telephone message service. This service is used when the called party is not answering the phone. Upon detecting the no-answer condition, the Private Branch Exchange ("PBX") of the establishment forwards the call to an attendant or to an answering machine. If an attendant receives the call, he or she enters the received message in the system of the present invention. If a message is recorded on the answering machine, an attendant must manually retrieve it and enter it into the system. The system then commands the ICM servicing the called party to turn the TV monitor on if it is off and to display the information received from the audio/video module on the screen. The information informs the user that he or she has a message and displays instructions to retrieve the message. If the message is urgent, the system displays a notice indicating that the user has an urgent message waiting to be retrieved.

4. Video Communication Services

The present system is designed to interface with the existing PBXs manufactured by major U.S. companies, such as AT&T or Northern Telecom Corporation. The system interfaces with the PBX system located at the customers' premises without any modifications to the PBX system. This enables the system to offer a service, whereby the party originating a call appears on the screen of the TV monitor associated with the party receiving the call when the phone rings. The system uses video cameras located at site of the originating party to obtain the video picture of the originating party. The output of the video camera is transferred to either the switch matrix or the modulator group in the audio/video module (depending on the design of the audio/video module) via a video interface.

For all intra-PBX calls, the originating and receiving parties are identified to the system by the PBX. Using this information, the master processor determines the address of the ICM associated with the receiving party and the address of the video input signal on the switching matrix associated with the originating party's telephone. The master processor instructs the ICM to switch the TV monitor associated with the receiving party and instructs the audio/video module to provide the video signal of the originating party to the ICM. The receiving party can now view the originating party through the TV monitor while the telephone rings. The video signal is removed from the TV monitor when both or either party hangs up the telephone or if the call is abandoned by the originator.

For example, a very useful application would be to provide a one-way video transmission from the hotel courtesy (house) phones to the guests' rooms. When a party uses a house phone to call a guest in his/her room, the guest would automatically view the calling party on his/her television set with or without answering the phone.

The hotel management can also use this service to communicate with a guest or a group of guests. The management selects this service through the keyboard of a responsible slave processor and inputs the room number of each recipient. Using this information, the master processor addresses the appropriate ICM(s) and instructs the audio/video module to transmit the voice and the video image of the management to the ICM(s). The connection is terminated when requested by the management by pressing pre-defined keys on the keyboard.

5. Information Retrieval Services

The system of the present invention is capable of interfacing with the management or information systems of a particular establishment through the master processor or the slave processor. Accordingly, the system of the present invention can access the information stored in the management or information systems and use it for various applications. For example, once a user has been entered into the management system, the present invention can access that information and determine the ICM and TV monitor allocated to the user. The system uses this information to send the initial welcome message to the respective ICM and TV monitor. Otherwise, once the user turns the TV monitor on, the initial message is displayed on the screen. A typical initial message includes a welcome statement and a list of all services offered by the system.

A user can also review his or her bill via the TV monitor in his/her room. Upon receiving a request to review the bill from a user, the master or slave processor, where applicable, retrieves the information from the management or information system, and displays it, as explained before, for the user to review.

Another example is that a doctor, through the system of the present invention, can ask for a particular patient's information. Upon requesting this service, the master processor or the responsible slave processor contacts the management or information system of the particular establishment and asks for the information requested. Once the information is received by the master processor, it relays the information to the doctor through the audio/video module as previously described.

6. By-Passing the Local Phone Company

Figure 13:
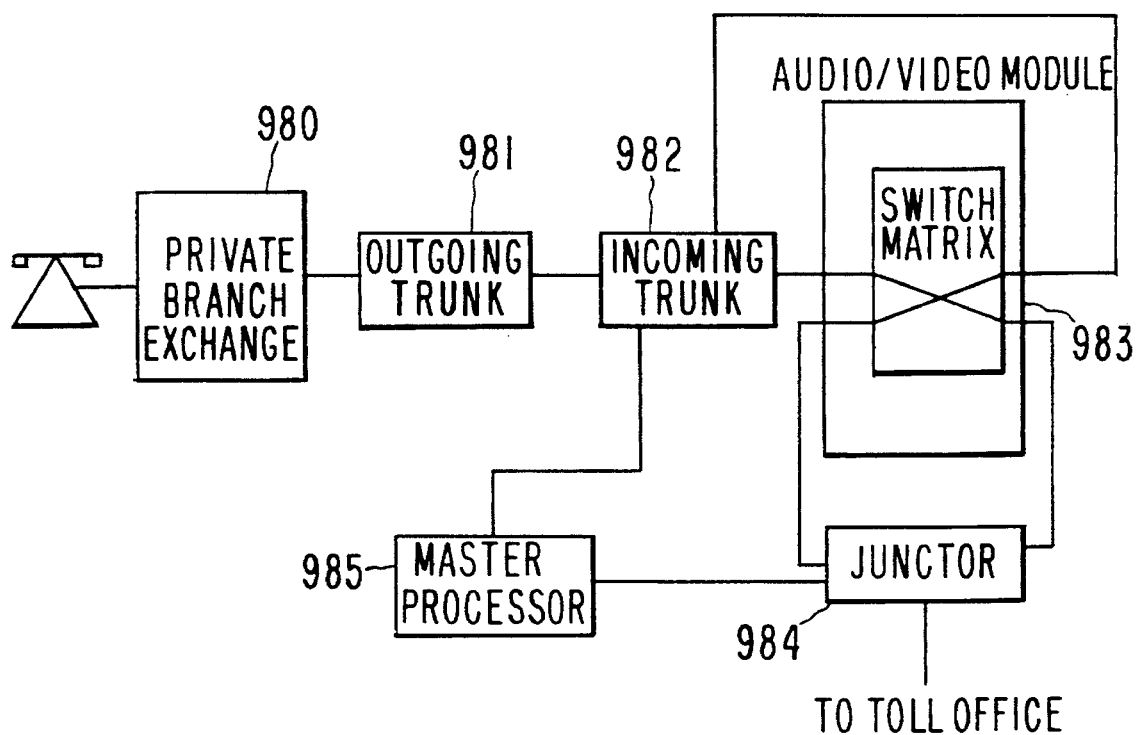
FIG. 13 illustrates a circuit diagram that enables the system to provide the local phone company bypass service.

The present system is designed to act as a "bypass" switch to the local telephone exchange on long distance phone calls originating from the establishment. FIG. 13 illustrated how the local branch exchange located at the establishment is connected to the system of the present invention to provide this service. When Local branch exchange 980 recognizes from the prefix digits that a toll request is being made, it connects the call to outgoing trunk 981 which is connected to incoming trunk 982 of the system of the present invention. Master processor 985, or the associated slave processor, recognizing from the "class of service" indication that a toll call is being originated, instructs audio/video module 983 to connect the outgoing signal from local branch exchange 980 to the long distance toll office via juncture 984. Since this a two-way communications, master processor 985, or the responsible slave processor, instructs the audio/video module to connect the incoming signal to incoming trunk 982. This signal is then relayed to local branch exchange via outgoing trunk 981. The system is connected to the long distance carriers through a private wire arrangement or line of sight microwave. Additional digits as dialed by the calling party are transmitted to the toll office with or without any prefix digits as required. The above arrangement completely bypasses the local exchange for all toll calls. In the USA, such an arrangement is permitted by the FCC.

While the above is a complete description of the preferred embodiments of the present invention, various alternatives, modifications and equivalents are possible. Therefore, the above description does not limit the scope of the present invention. The appended claims define the scope of the invention.

I claim:

1. A system for providing information, management, and entertainment services via audio and video signals sent to a TV monitor under the control of commands, the system comprising:

a master processor;

a first TV monitor having means for receiving audio and video signals;

a first control module, coupled to said TV monitor, for receiving said commands and for directing selected audio and video signals to said receiving means of said first TV monitor in response to said commands;

a communications module for providing said commands to said control module;

a command transmit line coupled between the communications module and the control module for carrying said commands from the communications module to the control module;

a controller coupled between said master processor and said communications module, said controller generating said commands in response to a first signal from said master processor;

means coupled to said communications module and said master processor for generating audio and video signals in response to signals from said master processor; and audio and video transmission means coupled between said control module and said means for generating audio and video signals;

first remote means optically coupled to said first control module for allowing the control module to receive a request signal.

2. Said system of claim 1 and further comprising:

a second TV monitor having means for receiving said commands;

a second control module to direct said commands to said receiving means of said second TV monitor; and second remote means optically coupled to said second control module for allowing the second control module to receive a request signal.

3. Said system of claim 2 and further comprising:

communications means coupled between said first and second control module, said controller, and said means for generating audio and video signals for providing communications channels between each control module, said controller and said means for generating audio/video signals.

4. Said system of claim 3, wherein each of said control modules is comprised of:

a processor board;

means coupled to said processor board for communication with said controller, said means for communicating with said controller transmitting the request signal to said controller and receiving the commands from said controller;

means coupled to said processor board for defining a unique address;

means coupled to said processor board for receiving and generating infrared signals representing the request signal and the commands;

means coupled to said processor board for detecting whether said TV monitor is off; and software means for controlling the operation of the control module and the TV monitor corresponding to the given control module.

5. Said system of claim 4, wherein said unique address enables said master processor to monitor each control module periodically.

6. Said system of claim 4, wherein said software means operates to control the corresponding TV monitor in response to an infrared signal generated by the corresponding remote means.

7. Said system of claim 4, wherein said software means operates to cause said means for generating and receiving infrared signals to generate an infrared signal in response to an infrared signal generated by said remote means to control said operation of said corresponding TV monitor.

8. Said system of claim 7, wherein said generated infrared signal is reflected by an object before being received by said receiving means of said corresponding TV monitor.

9. Said system of claim 4, wherein said means for communicating with said controller being coupled to said controller through said communications means.

10. Said system of claim 3, wherein said means for generating audio and video signals comprises:

a first audio/video source having an output terminal, said first audio/video source being operable to generate audio and video signals at its output terminal;

means coupled to said master processor for generating video graphics signals, said generating means having a plurality of outputs;

a first modulator group having a plurality of outputs and a plurality of inputs coupled to said output of said first audio/video source and said plurality of outputs of said video graphics signal generating means;

a first combiner coupled to said plurality of outputs of said first modulator group;

a second combiner having at least three video inputs coupled to local broadcast, to satellite broadcast, and to local cable, respectively, and an output terminal coupled to said first combiner.

11. Said system of claim 10 and further comprising:

a second audio/video source having an output terminal coupled to one of said plurality of inputs of said first modulator, said second audio/video source being operable to generate audio and video signals at its output terminal;

a second modulator group having a plurality of outputs and a plurality of inputs coupled to said output of said first and second audio/video source and said plurality of outputs of said video graphics signal generating means; and a third combiner coupled to said plurality of outputs of said second modulator group and said output of said second combiner.

12. Said system of claim 11, further comprising a switching matrix coupled between said first and second audio/video sources, said means for generating videographics signals and said inputs of said first and second modulator groups, said switching matrix having a plurality of inputs and a plurality of outputs.

13. Said system of claim 12, wherein said switching matrix further comprises means for communicating with said master processors, said communicating means generating signals to control said switching matrix in response to a third signal from said master processor.

14. Said system of claim 13 further comprising at least one common modulator group coupled between said switching matrix and said first and third combiners, said at least one common modulator group having a plurality of input and output terminals.

15. Said system of claim 14, wherein said first and second modulator groups and said common modulator group comprise a plurality of individual modulators having input and output terminals.

16. Said system of claim 15, wherein said individual modulators of said common modulator groups are shared by said first and second modulator groups.

17. Said system of claim 14, wherein each of said modulators operates to modulate said video signal at its input.

18. Said system of claim 12, wherein each of switching matrix comprises a non-blocking, base-band switching device.

19. Said system of claim 3, wherein said controller comprises:

a communication control module coupled to said first and second control modules via said communications means; and an audio/video source control coupled to said means for generating audio and video signals.

20. Said system of claim 19, wherein said communication control module comprising:

a processor board; and means for communicating with said first and second control module and said master processor.

21. Said system of claim 20, wherein said audio/video source control comprises:

means for communicating with said master processor; and means for controlling said plurality of said audio/video sources in response to said second signal from said master processor.

22. Said system of claim 3, wherein said services comprise video communications service, retrieval of information from a management and information system service, or bypassing the local phone company's system service.

* * * * *